United States Patent
Kinio et al.

(10) Patent No.: US 12,179,379 B2
(45) Date of Patent: Dec. 31, 2024

(54) ADHESIVE WITH TACK AND USE IN WOOD COMPOSITE PRODUCTS

(71) Applicant: ECOSYNTHETIX INC., Burlington (CA)

(72) Inventors: Dennis Michael Kinio, Mississauga (CA); Niels Mathieu Barbara Smeets, Courtice (CA); Veronique Jollet, Burlington (CA); Emmanouil Karagiannidis, Salonika (GR); Lem Gabrehiwet, Burlington (CA); Julien Francois Marie Antoine Philippe Mesnager, Burlington (CA)

(73) Assignee: ECOSYNTHETIX INC., Burlington (CA)

( * ) Notice: Subject to any disclaimer, the term of this patent is extended or adjusted under 35 U.S.C. 154(b) by 0 days.

(21) Appl. No.: 16/621,225

(22) PCT Filed: Jun. 29, 2018

(86) PCT No.: PCT/CA2018/050806
§ 371 (c)(1),
(2) Date: Dec. 10, 2019

(87) PCT Pub. No.: WO2019/000103
PCT Pub. Date: Jan. 3, 2019

(65) Prior Publication Data
US 2020/0198177 A1    Jun. 25, 2020

Related U.S. Application Data

(63) Continuation-in-part of application No. 15/637,694, filed on Jun. 29, 2017, now Pat. No. 10,876,022.

(30) Foreign Application Priority Data

Jun. 30, 2017   (CA) ................................ CA 2972410

(51) Int. Cl.
| | |
|---|---|
| *B27N 3/00* | (2006.01) |
| *B27N 1/02* | (2006.01) |
| *B27N 3/02* | (2006.01) |
| *C08L 3/04* | (2006.01) |
| *C08L 75/04* | (2006.01) |
| *C08L 89/00* | (2006.01) |
| *C08L 97/02* | (2006.01) |

(52) U.S. Cl.
CPC ........... *B27N 3/002* (2013.01); *B27N 1/0209* (2013.01); *B27N 3/02* (2013.01); *C08L 3/04* (2013.01); *C08L 75/04* (2013.01); *C08L 89/00* (2013.01); *C08L 97/02* (2013.01)

(58) Field of Classification Search
CPC ............. C08L 75/04; C08L 89/00; C08L 3/04
See application file for complete search history.

(56) References Cited

U.S. PATENT DOCUMENTS

| | | | |
|---|---|---|---|
| 3,879,212 A | 4/1975 | Yoshida et al. | |
| 4,801,631 A | 1/1989 | Sachs et al. | |
| 4,849,262 A | 7/1989 | Uhl et al. | |
| 4,944,823 A * | 7/1990 | Stofko | ............... C08G 18/3218 |
| | | | 156/331.7 |
| 5,190,818 A | 3/1993 | Sakai | |
| 5,503,668 A | 4/1996 | Giesfeldt et al. | |
| 6,017,998 A | 1/2000 | Duan et al. | |
| 6,291,579 B1 | 9/2001 | Kalck et al. | |
| 6,677,386 B1 | 1/2004 | Giezen et al. | |
| 6,790,271 B2 | 9/2004 | Thames et al. | |
| 6,818,686 B1 | 11/2004 | Colpaert et al. | |
| 6,822,042 B2 * | 11/2004 | Capps | ................ C08G 18/6484 |
| | | | 428/292.4 |
| 8,133,952 B2 | 3/2012 | Pisanova et al. | |
| 8,440,747 B2 | 5/2013 | Combs et al. | |
| 8,895,643 B2 | 11/2014 | Combs et al. | |
| 8,907,012 B2 | 12/2014 | Umemura et al. | |
| 9,303,114 B2 | 4/2016 | Ogawa et al. | |
| 9,562,177 B2 | 2/2017 | Mann et al. | |
| 10,947,429 B2 * | 3/2021 | Salehpour | .......... C08G 18/7664 |
| 2003/0077444 A1 | 4/2003 | Bond et al. | |
| 2004/0043043 A1 | 3/2004 | Schlyter et al. | |
| 2005/0145829 A1 | 7/2005 | Leyrer et al. | |

(Continued)

FOREIGN PATENT DOCUMENTS

| | | |
|---|---|---|
| CN | 1957012 A | 5/2007 |
| CN | 101362349 A | 2/2009 |

(Continued)

OTHER PUBLICATIONS

Ibrahim et al. (BioResources, 14(3), 2019, 6485-6500) (Year: 2019).*
Chinese Patent Application No. 201580070432.2, Office Action dated Jun. 10, 2021—English Translation Available.
Chinese Patent Application No. 201580070432.2, Office Action dated Apr. 6, 2021—English Translation Available.
Chinese Patent Application No. 201880043665.7, Office Action dated Jul. 19, 2021—English Translation available.
European Patent Application No. 21160512.6, Extended European Search Report dated Jul. 20, 2021.
Canadian Patent Application No. 3,080,747, Office Action dated May 21, 2021.
Brazilian Patent Application No. BR112017013548, Office Action dated Jan. 23, 2020.

(Continued)

*Primary Examiner* — Liam J Heincer

(57) ABSTRACT

This invention discloses adhesive compositions useful for providing cohesive strength to particles, for example a mat of wood particles produced while making particleboard prior to curing. The adhesive compositions has a) one or more biopolymers and b) one or more monomers or oligomers. An oligomer may have a degree of polymerization of 4 or less. The weight ratio of the monomer/oligomer to the biopolymer is optionally between 30:70 and 80:20. Optionally, the adhesive compositions may be combined with an isocyanate. The adhesive composition may be used to make no added formaldehyde wood composites such as particleboard.

25 Claims, 9 Drawing Sheets

(56) References Cited

U.S. PATENT DOCUMENTS

| | | | |
|---|---|---|---|
| 2006/0073334 A1 | 4/2006 | Schwantes et al. | |
| 2006/0231968 A1 | 10/2006 | Cowan et al. | |
| 2007/0225442 A1 | 9/2007 | Dotuka et al. | |
| 2007/0240823 A1 | 10/2007 | Alevisopoulos et al. | |
| 2008/0021187 A1 | 1/2008 | Wescott et al. | |
| 2009/0215954 A1 | 8/2009 | Gertzmann et al. | |
| 2010/0251932 A1 | 10/2010 | Sujeeth et al. | |
| 2011/0027594 A1 | 2/2011 | Johnson et al. | |
| 2011/0301292 A1* | 12/2011 | Miller | C08G 18/10 524/705 |
| 2012/0214909 A1* | 8/2012 | Wescott | C08G 18/3206 524/9 |
| 2012/0309246 A1 | 12/2012 | Tseitlin et al. | |
| 2013/0005867 A1 | 1/2013 | Varnell | |
| 2013/0131223 A1 | 5/2013 | Bouguettaya et al. | |
| 2013/0131231 A1 | 5/2013 | Bouguettaya et al. | |
| 2013/0161259 A1 | 6/2013 | Moliere | |
| 2013/0255880 A1* | 10/2013 | Mahdi | C08G 18/168 156/331.7 |
| 2014/0329000 A1 | 11/2014 | Moriarty | |
| 2015/0267095 A1 | 9/2015 | Parker et al. | |
| 2017/0342302 A1* | 11/2017 | Salehpour | B27N 3/002 |

FOREIGN PATENT DOCUMENTS

| | | |
|---|---|---|
| CN | 101524857 A | 9/2009 |
| CN | 101955748 A | 1/2011 |
| CN | 102199410 A | 9/2011 |
| CN | 103180137 A | 6/2013 |
| CN | 103403122 A | 11/2013 |
| CN | 104946176 A | 9/2015 |
| CN | 105585996 A | 5/2016 |
| DE | 2336381 A1 | 2/1975 |
| EP | 0335342 A1 | 10/1989 |
| EP | 0464781 A1 | 1/1992 |
| FR | 2932488 A1 | 12/2009 |
| JP | 2000301503 A | 10/2000 |
| WO | 0069916 A1 | 11/2000 |
| WO | 03035740 A1 | 5/2003 |
| WO | 2008022127 A1 | 2/2008 |
| WO | 2011156380 A2 | 12/2011 |
| WO | 2013036744 A1 | 3/2013 |
| WO | 2015104349 A2 | 7/2015 |
| WO | 2016009062 A1 | 1/2016 |
| WO | 2016101063 A1 | 6/2016 |
| WO | 2016141126 A1 | 9/2016 |

OTHER PUBLICATIONS

Canadian Patent Application No. 2,970,909, Office Action dated Dec. 27, 2018.
Canadian Patent Application No. 2,970,909, Office Action dated May 24, 2019.
Canadian Patent Application No. 2,970,909, Office Action dated Oct. 18, 2019.
Canadian Patent Application No. 2,970,909, Office Action dated Aug. 31, 2018.
Chilean Patent Application No. 201701568, Office Action dated Jun. 10, 2019—English Translation Not Available.
Chilean Patent Application No. 201701568, Office Action dated Aug. 8, 2018—English Translation Not Available.
Chinese Patent Application No. 201580070432.2, Office Action dated Mar. 3, 2020—English Translation Available.
Chinese Patent Application No. 201580070432.2, Second Office Action dated Sep. 2, 2019—English Translation Available.
Chinese Patent Application No. 201880043665.7, Office Action dated Jan. 4, 2021—English Translation available.
Chinese Patent Application No. 201580070432.2, Office Action dated Dec. 9, 2020—English Translation Available.
Chinese Patent Application No. 201580070432.2, Office Action dated Aug. 19, 2020—English Translation Available.
Chinese Patent Application No. CN201580070432.2, Office Action dated Dec. 19, 2018—English Translation Available.
European Patent Application No. 15871382.6, Office Action dated Sep. 19, 2019.
European Patent Application No. 15871382.6, Extended European Search Report dated Aug. 14, 2018.
European Patent Application No. 15871382.6, Office Action dated Feb. 19, 2020.
International Patent Application No. PCT/CA2015/050371, International Preliminary Report on Patentability dated Jul. 6, 2017.
International Patent Application No. PCT/CA2015/050371, International Search Report and Written Opinion dated Sep. 10, 2015.
Maningat and Seib., "Understanding the Physicochemical and Functional Properties of Wheat Starch in Various Foods", Cereal Chemistry, Jul. 2010, vol. 87(4), pp. 305-314.
U.S. Appl. No. 15/637,694, Final Office Action dated Sep. 27, 2019.
U.S. Appl. No. 15/637,694, Advisory Action dated Dec. 16, 2019.
U.S. Appl. No. 15/537,531, Non-Final Office Action dated Mar. 11, 2020.
U.S. Appl. No. 15/637,694, Notice of Allowance dated Sep. 23, 2020.
U.S. Appl. No. 15/537,531, Non-Final Office Action dated Feb. 28, 2019.
U.S. Appl. No. 15/637,694, Notice of Allowance dated Jun. 22, 2020.
U.S. Appl. No. 15/537,531, Final Office Action dated Oct. 29, 2019.
U.S. Appl. No. 15/537,531, Non-Final Office Action dated Aug. 17, 2020.
U.S. Appl. No. 15/637,694, Non-Final Office Action dated Jan. 14, 2019.
U.S. Appl. No. 15/637,694, Restriction Requirement dated Oct. 5, 2018.
U.S. Appl. No. 15/637,694, Non-Final Office Action dated Mar. 23, 2020.
Valodkar et al., "Isocyanate Crosslinked Reactive Starch Nanoparticles for Thermo-Responsive Conducting Applications," Carbohydrate Research, Nov. 2010, vol. 345 (16), pp. 2354-2360.
Wang et al., "Study on Molecular Weight Distribution of Starch of Different Varieties," Journal of South China University of Technology, vol. 25(7), pp. 30-34.
Whistler., "Solubility of Polysaccharides and Their Behavior in Solution," Advances in Chemistry, Chapter 14, 1973, pp. 242-255.
International Patent Application No. PCT/CA2018/050806, International Search Report and Written Opinion dated Sep. 10, 2018.
International Patent Application No. PCT/CA2018/050806, International Preliminary Report on Patentability dated Jan. 9, 2020.
Franklin and Associates, Cradle-to-Gate Life Cycle Inventory of Nine Plastic Resins and Four Polyurethane Precursors, The Plastics Division of the American Chemistry Council, Aug. 2011, pp. 13-1-13-9, M-1-M-13.
Sahaf, A. et al., Tack and shear strength of hybrid adhesive systems made of phenol-formaldehyde, dextrin and fish glue, and acrylic pressure-sensitive adhesive. Holzforschung 66:73-78, 2012.
Wang, et al., "Factors affecting volatile organic compound emissions during hot-pressing of southern pine Particleboard", Forest Products Journal 53(3), 2003, 65-72.
Leichti et al., "Effect of Synthesis Variables on Tack in Urea-Formaldehyde Resin", The Journal of Adhesion, 1988, 25, 31-44.
Hamed, G.R., "Tack and green strength of elastomeric materials", Rubber Chemistry and Technology (1981) 54 (3): 576-595.
Himsel, A. et al., "Describing the sticking phenomenon of aminoplastic resins: introduction of a new test method", Wood Sci. Technol. 2015, 49, 681-694.
European Patent Application No. 18823893.5, Extended European Search Report dated Mar. 9, 2021.
U.S. Appl. No. 15/537,531, Notice of Allowance dated Feb. 3, 2021.
Chinese Patent Application No. 201880043665.7, Office Action dated Dec. 3, 2021.
Canadian Patent Application No. 3,080,747, Office Action dated Jan. 7, 2022.
Brazilian Patent Application No. 112019027386, Office Action dated Jul. 7, 2022.

(56) References Cited

OTHER PUBLICATIONS

Brazilian Patent Application No. 112017013548-5, Office Action dated Mar. 23, 2022.
Chilean Patent Application No. 201701568, Office Action dated Jul. 13, 2022.
U.S. Appl. No. 17/101,420, Notice of Allowance dated Aug. 16, 2022.
U.S. Appl. No. 17/101,420, Restriction Requirement dated Feb. 16, 2022.
U.S. Appl. No. 17/101,420, Non Final office Action dated Apr. 20, 2022.
Brazilian Patent Application No. BR112019027386-7, Office Action dated Jun. 9, 2023.
Asafu-Adjaye et al., "Increasing Cold Tack of Polymeric Methylene Diphenyl Diisocyanate Resin with Partial Soy Flour Substitution", Forest Products Journal, 2020, vol. 70, No. 1, pp. 143-144.
Frazier, "Isocyanate Wood Binders", Handbook of Adhesive Technology, Second Edition, Revised and Expanded, 2003, chapter 33 [retrieved Apr. 28, 20238 from https://www.researchgate.net/publication/266041515_Isocyanate_Wood_Binders].
Leichti, "Effect of Synthesis Variables on Tack in Urea-Formaldehyde Resin", J. Adhesion, 1988, vol. 25, pp. 31-44.
Mantanis et al., "Adhesive systems used in the European particleboard, MDF and OSB industries", Wood Material Science & Engineering, 2018, vol. 13, No. 2, pp. 104-116.
Solt et al., "Technological performance of formaldehyde-free adhesive alternatives for particleboard industry", International Journal of Adhesion and Adhesives, 2019, vol. 94, pp. 99-131.
Wurtz, "Technical Information—PAT-5177/N".
European Patent Application 18823893.5, Office Action dated Mar. 23, 2023.
Brazilian Patent Application No. 112019027386-7, Office Action dated Feb. 20, 2024.
Canadian Patent Application No. 3,066,629, Office Action dated Feb. 20, 2024.
Brazilian Patent Application No. 112019027386-7, Office Action dated Sep. 10, 2024.
European Patent Application No. 18823893.5, Office Action dated Sep. 2, 2024.

* cited by examiner $\beta = 0.48$ $\beta = 0.38$

ADHESIVE WITH TACK AND USE IN WOOD COMPOSITE PRODUCTS

RELATED APPLICATIONS

This specification is a continuation-in-part of U.S. application Ser. No. 15/637,694, filed Jun. 29, 2017, and a national stage entry of International Patent Application No. PCT/CA2018/050806, filed Jun. 29, 2018, which claims priority from U.S. application Ser. No. 15/637,694, Biopolymer and Isocyanate Based Binder and Composite Materials, filed on Jun. 29, 2017 and Canadian application 2,972,410, Adhesive with Tack and Use in Composite Products, filed on Jun. 30, 2017, which are incorporated herein by reference.

FIELD

This specification relates to adhesive compositions capable of imparting cohesive strength (tack) to a substrate, optionally called tackifiers, to a curable hybrid resin composition capable of imparting cohesive strength to a substrate before being cured, and to composite wood products such as particle board made with such compositions.

BACKGROUND

Composite wood products (or wood composite products) include, for example, particle board, alternatively called chipboard. Many composite wood products are conventionally made with formaldehyde-based resins. However, concerns over excess formaldehyde emissions have encouraged the creation of "no added formaldehyde" (NAF) resins. NAF resins should meet health, safety and environmental requirements, relevant performance requirements for the end product such as bonding strength and water resistance, and various requirements of the manufacturing process.

Isocyanate binders, such as polymeric methylene diphenyl diisocyanate (pMDI), have been used to make NAF wood composites such as particle board, oriented strand board (OSB) and medium density fiberboard (MDF). pMDI is used to make these products because, among other attributes, it has a low viscosity (less than 500 cPs at 40° C.) suitable for spraying on particles of wood in blow lines or resinators, resulting in finished boards with good water tolerance and mechanical properties. However, pMDI does not produce tack.

In manufacturing particle board, discrete particles of wood (typically chips or fines, but optionally including shavings, flakes, sawdust, etc.) and/or other lignocellulosic materials are dried (to a moisture content of about 2-3%) and graded to produce a furnish with a mix of particle sizes. The dry particles are mixed with a thermoset resin, and optionally various additives, in a resinator and then formed into a mat. The mat is typically pre-pressed, for example at about 70 psi and ambient temperature, to reduce the bulk of the mat, give some mechanical strength and enable a faster downstream process. Subsequently, the mat is transported to a hot press where the thermoset resin hardens and the board consolidates.

Typically, the mat is moved from the prepressing stage to the hot pressing stage utilizing an arrangement of conveyor belts. Differences in the thickness of the mat, varying levels of pull in the radial direction of the belt, and the presence of horizontal and vertical gaps at the transfer points between belt segments creates opportunities for mat breakage resulting in material spillage or portions of the final product being out of specification. Therefore, it is beneficial if the mat has some "tack" or slight stickiness, preferably a minimum level of adhesion between the loose particles sufficient to hold the wood mat in one piece through the production line. In addition to prepressing, adhesives can be added to the wood particles to keep them glued together with enough cohesive strength so that the mat can withstand mechanical distortions in the vertical and horizontal directions before reaching the hot pressing stage. A range of adhesive types can be used to temporarily provide cohesive strength to the particles under conditions of low or no applied pressure. These adhesives typically belong to the group identified as pressure sensitive adhesives (PSA), cold set adhesives, or more generally "tackifiers".

In particle board manufacturing, two approaches typically are used to develop enough tack in the mat to withstand transfer points and gaps through the production line: a) rely on the tack existing in the thermoset resin and, b) rely on additives (different from the thermoset resin) that provide tack. For example, currently, many facilities that produce particleboard use urea-formaldehyde (UF) thermoset resins. UF resins also provide tack. However, as discussed above, there is an increasing number of composite wood products made with no added formaldehyde (NAF) resins, some of which are based on isocyanates such as pMDI. However, isocyanates do not provide tack. Therefore, tackifiers are useful in combination with isocyanate resins.

INTRODUCTION

The following section is intended to introduce the reader to the detailed description to follow, and not to limit or define any claimed invention.

This specification describes adhesive compositions that can be used as a tackifier, and optionally as part of a curable hybrid resin composition. The compositions can be used to temporarily provide cohesive strength to one or more otherwise loose particles (alternatively called substrate). The substrate can be organic, for example lignocellulosic. The substrate can be in the form of, for example, chips, fines or other particles of wood. The composition can be used to provide enough cohesive strength to keep the particles together and, as a result, to help maintain the shape or mechanical integrity of a collection of the particles during handling, transport and processing operations. In some examples the composition is used to make a composite wood product such as particle board.

In at least some examples the adhesive composition includes water, one or more biopolymers, one or more monomers or oligomers, optionally one or more additives, and optionally one or more isocyanates. One or more of the components can be dissolved or dispersed in the water. The ratio by weight of the one or more monomers or oligomers to the one or more biopolymers can be in the range of 30:70 to 80:20. Optionally, the composition can be formed on the substrate or before being applied to the substrate.

The inventors have observed that a dispersion of biopolymer nanoparticles with isocyanate as described in International Publication Number WO 2016/101063 can provide tack, but only at a loading of the nanoparticles and moisture content relative to the weight of wood that exceeds typical particle board manufacturing conditions. The monomers or oligomers described herein also do not produce significant tack on their own. However, mixtures of biopolymer nanoparticles, and other forms of biopolymer, with monomer or oligomer can provide tack at a loading and moisture content useful for making particle board.

This specification also describes methods of applying an adhesive composition to a substrate. In some examples, a mixture of water, one or more biopolymers, one or more monomers and/or oligomers, and one or more isocyanates is prepared and then applied to a substrate such as wood chips or fines. In some examples, a mixture of water and one or more biopolymers, optionally with one or more monomers or oligomers, is applied to a substrate separately from applying one or more isocyanates to the substrate. In some examples, one or more biopolymers, one or more monomers or oligomers, and one or more isocyanates are applied to the substrate separately from each other. The adhesive composition can be cured later to form a composite wood product such as particle board.

BRIEF DESCRIPTION OF THE FIGURES

FIG. 9 also shows graph of the variation in isocyanate droplet size with Beta Value (ß) for two adhesive compositions, each having a 50:50 ratio by weight of biopolymer and monomer or oligomer.

DETAILED DESCRIPTION

Figure 1:
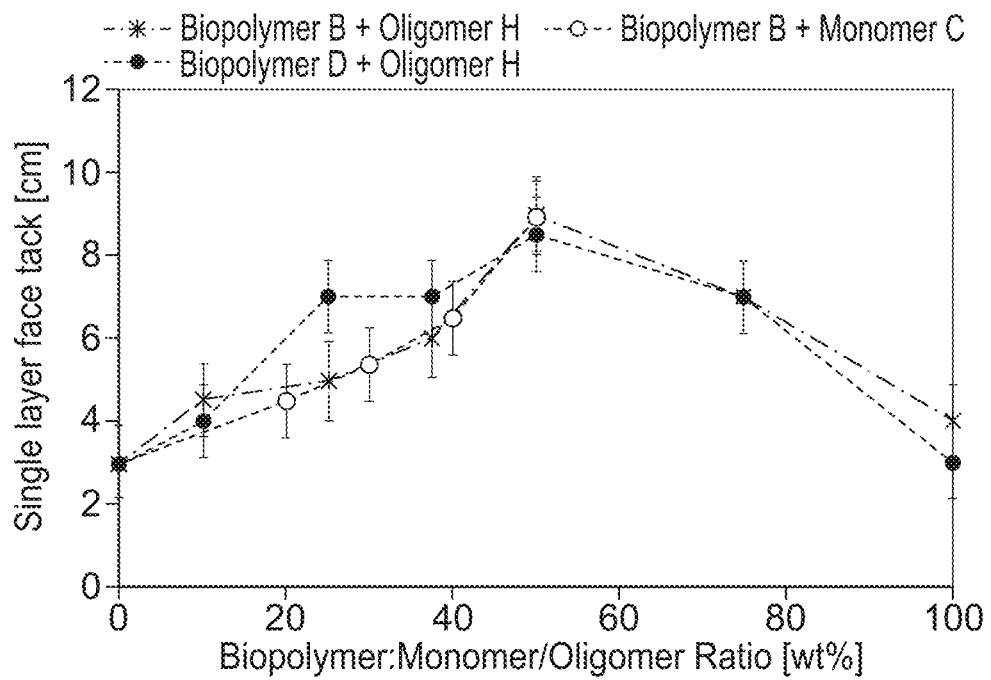
FIG. 1 is a graph showing tack at various ratios of biopolymer to monomer or oligomer.

Isocyanates useful as a resin include, without limitation, toluene diisocyanate (TDI), hexamethylene diisocyanate (HDI), methylene diphenyl diisocyanate (MDI) and polymeric MDI (pMDI). Polymeric MDI typically is a mixture of MDI, containing about 30 to 80% w/w 4,4'-methylene diphenyl isocyanate, with the remainder of the mixture comprised of higher molecular weight MDI oligomers and polymers. Isocyanates are generally not miscible in water although some emulsifiable MDI formulations (EMDI) are commercially available and may be used as resins. To make composite materials, the resin is mixed with a substrate and cured. Curing is typically triggered by heat applied to the resin and substrate mixture. The resin and substrate are often compressed during curing. As described further below, the resin may be used with a tackifier thereby creating a curable hybrid resin composition that can be cured but also provides tack before it is cured.

Unless the associated text suggests otherwise, the following terms will have meanings as described below.

Substrate: a plurality of particles, optionally with different shapes and sizes. A substrate can comprise lignocellulosic particles, for example, wood chips, fines and other wood or lignocellulosic particles that can be made into particle board. In a loose substrate, the particles are loose or disaggregated. In an uncured glued composite substrate, the particles have been aggregated into a certain shape or form in the presence of an adhesive composition or curable hybrid resin composition, optionally with pre-pressing at ambient temperature but without undergoing a curing step for example involving increase of temperature or pressure or irradiation.

Adhesive composition: a combination of water and (a) one or more biopolymers; (b) one or more monomers and/or oligomers; and, optionally (c) one or more additives, which may be blended together or applied to loose substrate in two or more sub-combinations.

Curable hybrid resin composition: an adhesive composition combined with a thermosetting resin, for example one or more isocyanates. The components of the curable hybrid resin composition may be applied to a loose substrate in a mixture of all of the components or in two or more parts or sub-mixtures. A mixture including at least a biopolymer and an isocyanate optionally comprises a water phase with one or more isocyanates dispersed in the water phase, optionally wherein the isocyanate phase has been stabilized by the biopolymer or one or more additives in the water phase, for example as described in International Publication Number WO 2016/101063, which is incorporated herein by reference.

Tack: the property of an adhesive that enables it to form a bond of measureable strength immediately after adhesive and substrate are brought into contact under low pressure (from A.A. Marra Technology of Wood Bonding: Principles in Practice. New York: Van Nostrand Reinhold; 1992).

Push Test: a test for measuring tack wherein an uncured glued composite substrate is pushed at a constant speed over an edge. The tack is measured by the distance (for example in cm) that said substrate is able to pass until it breaks. In the examples herein, the device used to perform the "push test" is adapted from the one described in detail in R. J. Leichti C. Y. Hse, R. C. Tang, *J. Adhesion*, 1988, 25, 31-44. A similar device has been described in US patent application 8895643 B2 by G. G. Combs, N. Barksby and J. F. Dormish; 2014. In the tests herein, a sample is prepared by forming a mat of uncured glued composite substrate with dimensions 305×305×50 mm. The mat is subsequently compacted under a slight pressure (5.6 kg/cm$^2$) for a short amount of time (30 s). The push speed is 6 cm/s.

Various adhesive compositions that can be used as a tackifier, and optionally also as a part of a curable hybrid resin composition, will be described below. In at least some examples the adhesive composition includes water, one or more biopolymers, one or more monomers or oligomers and, optionally one or more additives. The components other than water can optionally be dissolved or dispersed in water. The ratio of the one or more biopolymers to the one or more monomers or oligomers can be in the range of 30:70 to 80:20, or as further defined herein.

In a curable hybrid resin composition including one or more isocyanates, the mass of isocyanate is optionally not more than 150%, or not more than 130%, or not more than 110% of the mass of water in the composition as it is applied to wood (i.e. excluding the water in the wood). The mass of biopolymer is optionally not more than 55% of the mass of water. The ratio of biopolymer to isocyanate is optionally between 80:20 and 15:85, or between 50:50 to 15:85, or 25:75 or more.

In some examples, the biopolymer, monomer/oligomer and water are mixed, and the isocyanate is added to the mixture. Preferably, the biopolymer, monomer/oligomer and water form a stable dispersion or solution before isocyanate is added. The isocyanate may be added to the biopolymer, monomer/oligomer and water mixture with mixing by mechanical agitation and/or by feeding components into an in-line static mixer. The isocyanate and biopolymer in water may form a relatively stable emulsion or other dispersion. The term "relatively stable" used above preferably indicates sufficient emulsion stability so as not to significantly build viscosity for an acceptable time at a specific temperature. In wood composite industry terms, the requirement in terms of stability is to ensure that there is sufficient process "pot life" for the aqueous isocyanate emulsion. For making particle board, viscosity should be less than 1000 cP, or less than 700 cP, at 40° C. for at least 15 minutes. Optionally, a pre-mixed curable hybrid resin composition has a viscosity of less than 500 cP, or less than 300 cP. A pre-mixed curable hybrid resin composition may remain with low viscosity for 30 minutes or more, or 60 minutes or more.

In other examples, water, biopolymer, monomer/oligomer and isocyanate are applied to a wood substrate in two or more parts. In some examples, water, biopolymer, and monomer/oligomer may be mixed together before being applied to the wood while the isocyanate component is applied separately. In some examples, biopolymer, optionally with water, monomer/oligomer, optionally with water, and isocyanate are each applied separately.

In some examples, the aqueous composition is used to make wood composites such as particle board. pMDI, when used alone, is typically sprayed on wood chips or fines at about 1 to 6 g pMDI per 100 g wood. The curable hybrid resin composition may be, for example, applied at 2 to 10 g solids of curable hybrid resin composition per 100 g of wood. The amount of isocyanate in the curable hybrid resin composition may be 4 g per 100 g wood or less. Although the amount of isocyanate can be reduced, the increased total application rate allows for a better distribution of the isocyanate on the wood and may be compatible with equipment used for spraying formaldehyde based resins, which is typically applied at about 10 g urea formaldehyde (UF) per 100 g of wood. The combined solids weight of the biopolymer and isocyanate may be between 2% and 8% of the weight of the wood. All weights discussed in this paragraph exclude the weight of any water Wood substrates for making particle board are typically dried to 2-3% water (moisture content) then passed through a resinator where the adhesive composition or curable hybrid resin composition and optionally additional water are applied. Loading rates described herein of adhesive composition, curable hybrid resin composition, or any component of either of them, are calculated on the basis of wood fully dried (essentially 0% water). Unless stated otherwise, adhesive composition or curable hybrid resin composition loading rates refer only to the dried solids (non-water components) of the compositions (i.e. the weight of any water in the composition is excluded). Unless stated otherwise, moisture reported in the context of an uncured glued composite substrate is the total of water remaining in the wood substrate and water added as part of, or with, the adhesive composition or curable hybrid resin composition. This represents the moisture content of a substrate exiting a resinator or formed into an uncured mat in a particleboard manufacturing system.

In some examples, a curable hybrid resin composition is made by first extruding starch or a mixture of different starches or other biopolymers along with water and, optionally, a plasticizer and/or a crosslinker to form biopolymer nanoparticles or cold water soluble starch. The nanoparticles or cold water soluble starch are optionally dispersed in water in a ratio between about 30:70 to 80:20 by weight with one or more monomers or oligomers. This dispersion may have a solids content of about 25 to 75%. The dispersion is optionally then mixed in a ratio between about 80:20 and 15:85 with an isocyanate, for example pMDI or a mixture of pMDI with another isocyanate, on a solids (biopolymer and monomer/oligomer) to solids (isocyanate) mass basis. Optionally, the curable hybrid resin composition may be diluted by adding more water after the isocyanate is added. In another option, additional water can be sprayed on the substrate separately from the curable hybrid resin. The resulting composition has a low viscosity suitable for being sprayed or otherwise applied on wood chips or fines in a resinator used to make particle board. Optionally, dispersions or solutions of other biopolymers may take the place of the biopolymer nanoparticles or cold water soluble starch.

In other examples, a curable hybrid resin composition in a resinator or otherwise on a substrate. When making particle board, pre-dried wood particles (or other lignocellulosic particles) pass through a resinator. The resinator typically has multiple nozzles for spraying into a chamber containing the wood particles. The wood particles are mixed while and/or shortly after they are sprayed. Two or more parts of the curable hybrid resin composition may be sprayed on the substrate separately from different nozzles. For example, an aqueous dispersion or solution of biopolymer and monomer/oligomer can be sprayed on the substrates separately from the isocyanate through separate nozzles of a resinator. In another example, a dispersion or solution of the biopolymer, the monomer/oligomer, and the isocyanate can each be sprayed separately on the substrate through separate nozzles of a resinator. When one or more parts of a curable hybrid resin composition are applied to a substrate separately they contact each other and mix while on the substrate which is mixed in the resinator. Water as required to reach a particular target moisture content in the wood particle mat can be sprayed with the biopolymer and/or monomer/oligomer, or partially with the biopolymer and/or oligomer and partially from a separate nozzle.

The components of an adhesive composition or curable hybrid resin composition can be mixed in an in-line static mixer, for example of the type having a set of fins inside of a segment of tube. Two inlets are provided at the upstream end of the mixer. One inlet may carry a mixture of water, biopolymer and any monomer/oligomer or other additives. The second inlet carries an isocyanate. A mixed composition is produced at the downstream end of the mixer. The downstream end of the mixer may be connected to a resinator, or other sprayer or addition system.

In another example of a mixing process, the biopolymer and monomer/oligomer, if any, are mixed into water under appropriate conditions. Cold soluble starch, for example, may be mixed at 200 rpm using a mechanical prop mixer under relatively low shear. Starch nanoparticles may be dispersed with relatively high shear. The agitation speed may be about 400 rpm while the isocyanate is added slowly. Once all of the isocyanate is added, mixing continues for about 5 minutes until a homogenous emulsion is observed. Optionally, the emulsion may be diluted by adding more water while maintaining 400 rpm (indirect dilution). In another option, the mixture of biopolymer and water may be diluted by adding water and isocyanate simultaneously (direct dilution). Direct and indirect dilution generally produce emulsions with similar viscosity.

An adhesive composition or curable hybrid resin composition as described herein may have a viscosity that is suitable for being applied as droplets, for example sprayed, on a loose substrate to make composite materials such as particle board, for example a viscosity of 1000 cPs or less or 700 cPs or less at 40° C.

The one or more biopolymers can contain one or more polysaccharides, one or more polypeptides, or a combination thereof. For example, the composition may contain one or more amylaceous materials such as starch. For example, the amylaceous materials may contain more than 50% w/w starch on a dry basis. The amylaceous material may comprise a chemically, enzymatically, thermally or mechanically modified starch. The amylaceous material may be in the form of engineered starch nanoparticles either dry or dispersed in water. The starch nanoparticles can be obtained from waxy, dent, or potato starch or their blends. Water-dispersed starch nanoparticles can have an average particle size below 1 micron. The starch nanoparticles can have an average molecular weight (Mn) below 10,000,000 Daltons. The nanoparticles may contain more than 80% w/w starch on a dry basis. Alternatively or additionally, the composition may contain one or more cellulosic-based materials. The cellulosic-based material may comprise chemically, enzymatically, thermally or mechanically modified cellulose. Alternatively or additionally, the composition may contain one or more hemicellulosic-based materials. The hemicellulosic-based material may comprise chemically, enzymatically, thermally or mechanically modified hemicellulose. Alternatively or additionally, the composition may contain one or more proteinaceous materials. The proteinaceous material may contain more 15% w/w or more protein on a dry basis. The proteinaceous material may be in the form of a denatured protein or syrup, a material obtained via for example reactive extrusion of soy protein or degermed corn flour.

The one or more monomers or oligomers may be selected from the group of compounds with the ability to form hydrogen bonds or from the group of compounds containing one or more free hydroxyl groups (which is a sub-set of compounds with the ability to form hydrogen bonds). The one or more monomers or oligomers may be water soluble. The monomers or oligomers with hydroxyl groups may comprise one or more of: simple polyols (such as glycerol, ethylene glycol, diethylene glycol, triethylene glycol, tetraethylene glycol and oligomers of diethylene glycol), sugar alcohols (such as arabitol, xylitol, mannitol, sorbitol, maltitol, isomalt, lactitol, polyglicitol), monosaccharides (such as glucose, fructose, galactose), disaccharides (such as sucrose, lactose, lactulose, cellobiose, xylobiose, tetrahalose, maltose), amino sugars (such as galactosamine, glucosamine and chitobiose), sugar acids (such as aldonic acids, uronic acids and aldaric acids), oligosaccharides (such as gluco-oligosaccharide, fructo-oligosaccharides, galacto-oligosaccharides, mannan-oligosaccharides, isomalto-oligosacchries), carbohydrate syrups (such as glucose syrup, corn syrup, high fructose corn syrup, high maltose corn syrup, sweet sorghum syrup, maple syrup, birch syrup, fruit syrups, invert syrups), by-products of sugar refineries (such as molasses, treacle and golden syrup), products of hydrolysis of polysaccharides (such as starch, cellulose, xylans, pectins, chitin and glycogen), and their blends. A monomer capable of forming hydrogen bonds without hydroxyl groups is urea. Optionally, an oligomer may be a dimer, a trimer or a tetramer. The one or more monomers or oligomers may be referred to alternatively as a plasticizer.

A biopolymer typically contains polymer chains of varying lengths. The number-average degree of polymerization (or DP) is determined by dividing the number-average molecular weight of the sample, as determined for example by gel permeation chromatography (GPC), by the molecular weight of the relevant repeat units. The DP of a mixture of biopolymers can be calculated as a weighted average of the DP of the individual biopolymers in the mixture. The DP of the one or more biopolymers is optionally 5 or more, 10 or more, 100 or more or 300 or more.

The number-average degree of polymerization (or DP) of an oligomer can be determined experimentally as described above or by reference to a known molecular structure for essentially pure dimers, trimers or tetramers. The DP of a mixture of oligomers, or a mixture of one or more monomers and one or more oligomers, can be calculated as a weighted average of the DP of the individual monomers or oligomers in the mixture. The DP of the one or more monomers or oligomers is optionally 4 or less.

Under high loading and moisture conditions, many biopolymers produce tack. However, the loading and moisture required for high DP biopolymers can be too high for practical use in making particle board. Mats for making the face layers of particle board may have 5 wt % or more of biopolymer and over 10 wt % of water. Under these conditions, at least some biopolymers with a DP in the range of 5 to 100 or 5 to 50 (for example some cold water soluble dextrins or maltodextrins) may produce sufficient tack alone. Without intending to be limited by theory, these products may include a broad range of polymer chain lengths that includes some very long chains and some very short chains, which makes them to some extent like a mixture of a biopolymer and an oligomer. Alternatively, these products may have enough hydroxyl groups relative to their molecular weight to provide tack in the presence of sufficient moisture. However, in at least some cases, these biopolymers do not produce tack alone under lower loading and/or lower moisture conditions, for example 4 wt % biopolymer and 6-9 wt % water, at least when the substrate comprises dried lignocellulosic particles such as wood chips. These lower loading and lower moisture conditions are required to make, for example, the core layer of particleboard. In contrast, mixtures of biopolymer (regardless of DP) and monomer/oligomer maintain tack under similar lower moisture conditions.

Although biopolymers with high DP produce less tack when used alone than biopolymers with low DP, the tack of a mixture of high DP biopolymer and monomer/oligomer can, in at least some examples, be similar to the tack of a mixture of low DP biopolymer and monomer/biopolymer. Biopolymers with low DP, for example in the range of 5-50, are typically extensively processed from biopolymers that appear in nature with higher DP, and tend to be more expensive and/or less readily available than biopolymers with higher DP. Accordingly, it can be more convenient and/or economical to use a mixture including one or more biopolymers with DP of 100 or more. Although biopolymers with DP of 100 or more and monomers/oligomers with DP of 4 or less typically have very little tack on their own, when combined as described herein they produce tack much higher than what would be predicted by a weighted average of their tack when used alone. Optionally, the adhesive composition can include one or more monomers or oligomers having a DP of 4 or less and one or more biopolymers having a DP of 100 or more or 300 or more.

The adhesive composition may comprise, on a dry basis, a ratio between the weight of the one or more monomers or oligomers and the weight of the one or more biopolymers in the range of 30:70 to 80:20.

Optionally, the adhesive composition may comprise a pH modifier. The pH modifier may be an acid, a base or a salt. Optionally, the adhesive composition may comprise a rheology modifier. Optionally, the adhesive composition may comprise a biocide. Optionally, the adhesive composition may comprise an organic or inorganic humectant.

A curable hybrid resin composition may have an isocyanate-based liquid phase dispersed, for example emulsified, in a water phase. The isocyanate-based liquid phase may be stabilized by a biopolymer-based component into the water phase, one or more additives, or both.

An uncured glued composite product may comprise an adhesive composition or a curable hybrid resin composition. An uncured glued composite product may comprise lignocellulose-based substrate such as wood fines, wood chips or other particles useful for making particle board. The amount of dry (i.e. non-water) biopolymer and oligomer in an uncured glued composite product may be 1-7 wt %, based on dry loose substrate. The amount of isocyanate in an uncured glued composite product may be 1-6 wt %, based on dry loose substrate. The moisture content of an uncured glued composite product may be 6-14 wt %.

An uncured glued composite product may have enough cohesive strength (tack) to maintain shape and/or mechanical integrity during handling, transport and processing operations. Tack may be measured by a "push test". The uncured glued composite product may have a time-dependent tack profile as measured by "push test" that does not show tack decreases over time. The adhesive composition or curable hybrid resin composition may be useful for keeping loose inorganic or organic substrates (such as wood fibers, fines, chips, particles, etc.) glued together with enough cohesive strength to maintain shape and/or mechanical integrity at ambient process temperature during handling, transport and processing operations used in making particle board.

The adhesive composition typically comprises a blend of at least two components in water: (a) one or more biopolymers and (b) one or more monomers and/or oligomers; and optionally, (c) one or more additives.

The biopolymer part of an adhesive composition can be any combination of one or more biopolymers. Biopolymers suitable for this invention include a wide range of polymers produced by living organisms such as homogeneous or heterogeneous polysaccharides and polypeptides. Exemplary biopolymers within the polysaccharides group include amylaceous, cellulosic and hemicellulosic materials. Exemplary biopolymers within the polypeptide group include a wide range of plant-based and animal-based proteinaceous materials. Polysaccharides, and in particular amylaceous materials, appear to produce the most tack.

The term amylaceous material is typically used herein to mean any product, by product or waste stream with a content of at least 50% w/w of polymeric, underivatized or derivatized starch carbohydrates such as dextrins, amylose or amylopectin alone or in combination. Amylaceous materials include but are not limited to meals, starches or flours obtained from any cereal crop (e.g. corn, maize or wheat), root crop (e.g. tapioca), tuber crops (e.g. potato), leguminous crop (e.g. soy or pea) or any other commercial source of starch (e.g. engineered starch particles).

The term cellulosic material is typically used herein to mean any product, by product or waste stream with a content of at least 30% w/w of polymeric, underivatized or derivatized cellulosic carbohydrates: cellulosic and lignocellulosic fragments, cellulose, cellulose nanofibers, carboxy methyl cellulose, methyl cellulose, hydroxypropyl cellulose, hydroxyl ethyl cellulose, nanocellulose, microbial cellulose, etc. alone or in combination.

The term hemicellulosic material is typically used herein to mean any product, by product or waste stream with a content of at least 30% w/w of polymeric, underivatized or derivatized hemicellulosic carbohydrates: hemicellulosic fragments, xyloglucans, glucomannans, mannans, xylans, arabinoxylans, arabinogalactans, etc. alone or in combination. Hemicellulosic materials include but are not limited to side streams from pulp mills, streams from cellulosic biorefineries, streams from cellulosic ethanol biorefineries, etc.

The term proteinaceous material is typically used herein to mean any product, by product or waste stream with a content of at least 15% w/w of polymeric, underivatized or derivatized protein such as oligopeptides and polypeptides. Proteinaceous materials include but are not limited to syrups, meals, protein or flours obtained from grain crops (e.g. condensed distiller syrup, corn gluten meal, zein, rice protein, wheat protein), oil seed crops (defatted castor bean seed meal, defatted peanut meal, defatted rapeseed meal), root crops (e.g. cassava protein), fiber crops (e.g. defatted cottonseed meal), leguminous crops (e.g. soy protein and pea protein), animal sources (e.g. gelatin, none glue, lactalbumin or whey protein) or any other commercial source of protein (e.g. engineered or denatured protein).

Biopolymers may be modified, purified or derivatized using physical, chemical, thermal or enzymatic processes.

Without limitation, modified or derivatized amylaceous materials can be obtained through physical modifications (e.g. degermed meals, flours, granular starches, cold soluble starches, extruded starches); chemical modifications (e.g. hydrolyzed starch, cationic starch, hydrophobic starch, grafted starch, etc.), enzymatic modifications (e.g. enzymatically hydrolyzed starch); thermal modifications (i.e. dextrinized starch); thermo-mechanical modifications (e.g. thermoplastic starch); or a combination of modification processes (e.g. reactive extrusion resulting in engineered starch nanoparticles).

The manufacture of engineered biopolymer nanoparticles is described, for example, in International Publication Number WO 00/69916 and International Publication Number WO 2008/022127. Other methods are known in the art for making biopolymer nanoparticles. Even though the term "nanoparticle" usually refers to particles 100 nm and smaller, in this specification it is used to refer to particles that have an average particle size of about 1000 nm or less or that form a colloid in water.

In principle, any biopolymer, and mixtures thereof, may be used to make biopolymer nanoparticles. In an exemplary method, the biopolymer is heated and mechanically processed with water, optionally a plasticizer, optionally a crosslinker, and optionally other additives. The heating and mechanical processing may occur in an extruder, preferably a co-rotating twin screw extruder. The biopolymer, water and any plasticizer are preferably added to the feed zone of an extruder. The plasticizer may be a polyol such as glycerol. The crosslinker may be a reversible crosslinker. In an intermediate or gelatinization zone of the extruder, located downstream of the feed zone, the temperature is maintained between 60 and 200 degrees C., or between 100 and 140 degrees C. At least 100 J/g, or at least 250 J/g, of specific mechanical energy per gram of the biopolymer is applied in the intermediate zone. The pressure in the intermediate zone may be between 5 and 150 bar. A crosslinker, if any, may be added in a reaction zone that follows, or overlaps with the end of the intermediate zone. When the biopolymer is starch, the starch is substantially gelatinized (converted into a thermoplastic melt phase) in the intermediate zone. Starch nanoparticles primarily form hydrogel particles when dispersed although some of the starch may dissolve. The starch in at least a portion of the nanoparticle may have a molecular weight between about 700,000 and 800,000 Da.

Without limitation, modified or derivatized proteinaceous materials can be obtained through physical modifications (e.g. purification); chemical modifications (e.g. crosslinking, esterification, oxidation, etc.), enzymatic modifications (e.g. hydrolysis); thermal modification (e.g. denaturing); thermo-mechanical modifications (e.g. extrusion); or a combination of modification processes (e.g. reactive extrusion). Proteinaceous materials include but are not limited to purified proteins, protein concentrates, protein isolates, protein hydrolyzates, protein syrups, denatured proteins or engineered protein extrudates.

Without limitation, modified or derivatized lignocellulosic materials can be obtained through physical modifications (e.g. microfibrillated cellulose); chemical modifications (e.g. hydrolyzed cellulose, hemicelluloses and lignins, glyoxylated lignins, grafted cellulose, etc.), enzymatic modifications (e.g. enzymatically hydrolyzed lignocellulose); thermal modifications; thermo-mechanical modifications; or a combination of modification processes.

The monomer/oligomer part of an adhesive composition can be any combination of one or more monomers or oligomers. Exemplary monomers or oligomers suitable for this invention include water soluble compounds containing one or more free hydroxyl groups and compounds otherwise having the ability to form hydrogen bonds such as urea. Exemplary oligomers have a DP of 4 or less.

Examples of such monomers or oligomers with hydroxyl groups are:
- simple polyols such as glycerol, ethylene glycol, diethylene glycol, triethylene glycol, tetraethylene glycol and oligomers of diethylene glycol;
- sugar alcohols such as arabitol, xylitol, mannitol, sorbitol, maltitol, isomalt, lactitol, isosorbide, polyglicitol;
- monosaccharides such as glucose, fructose, galactose
- disaccharides such as sucrose, lactose, lactulose, cellobiose, xylobiose, tetrahalose, maltose and the like
- amino sugars such as galactosamine, glucosamine and chitobiose
- sugar acids such as aldonic acids, uronic acids and aldaric acids
- oligosaccharides such as gluco-oligosaccharide, fructo-oligosaccharides, galacto-oligosaccharides, mannan-oligosaccharides, isomalto-oligosaccharies, etc.
- carbohydrate syrups such as glucose syrup, corn syrup, high fructose corn syrup, high maltose corn syrup, sweet sorghum syrup, maple syrup, birch syrup, fruit syrups, invert syrups, etc.
- by-products of sugar refineries such as molasses, treacle and golden syrup
- products of hydrolysis of polysaccharides such as starch, cellulose, xylans, pectins, chitin and glycogen
- their blends.

Optionally, the adhesive composition may contain one or more additives. Examples of additives include rheology modifiers (e.g. urea, glycerol, calcium chloride); pH modifiers (e.g. mono or polycarboxylic organic acids and inorganic acids such as phosphoric acid or citric acid; urea; inorganic bases such as caustic; and/or inorganic salts such as sodium carbonate); humectants (e.g. glycerol or calcium chloride) and biocides. In the case of engineered biopolymer nanoparticles, one or more additives may optionally be added during the nanoparticle formation process.

Without intending to be limited or bound by theory, it is postulated that the tack performance of the adhesive compositions described herein may arise from the hydrogen bonding capacity of the biopolymer in combination with the external plasticization of the biopolymer in the presence of the monomers or oligomers. Indeed, many of the biopolymers disclosed herein are able to provide some tack on their own, however, the addition of one or more monomers or oligomers results in an enhancement of tack particularly in an uncured glued composite substrate with a low moisture content.

The adhesive composition may comprise between 30 and 80 percent of monomer/oligomer on dry basis of monomer/oligomer and biopolymer (i.e. the ratio of monomer/oligomer to biopolymer is between 30:70 and 80:20), optionally between 30 and 70 percent of monomer/oligomer on dry basis. In tests with a variety of biopolymers, significant increases in tack were regularly observed with 30 percent or more of monomer/oligomer on a dry basis. Tack was roughly doubled with at least 37.5 percent of monomer/oligomer up to about 70 or 80% of monomer/oligomer, and maximum tack was achieved at about 50 percent of monomer/oligomer.

Figure 2:
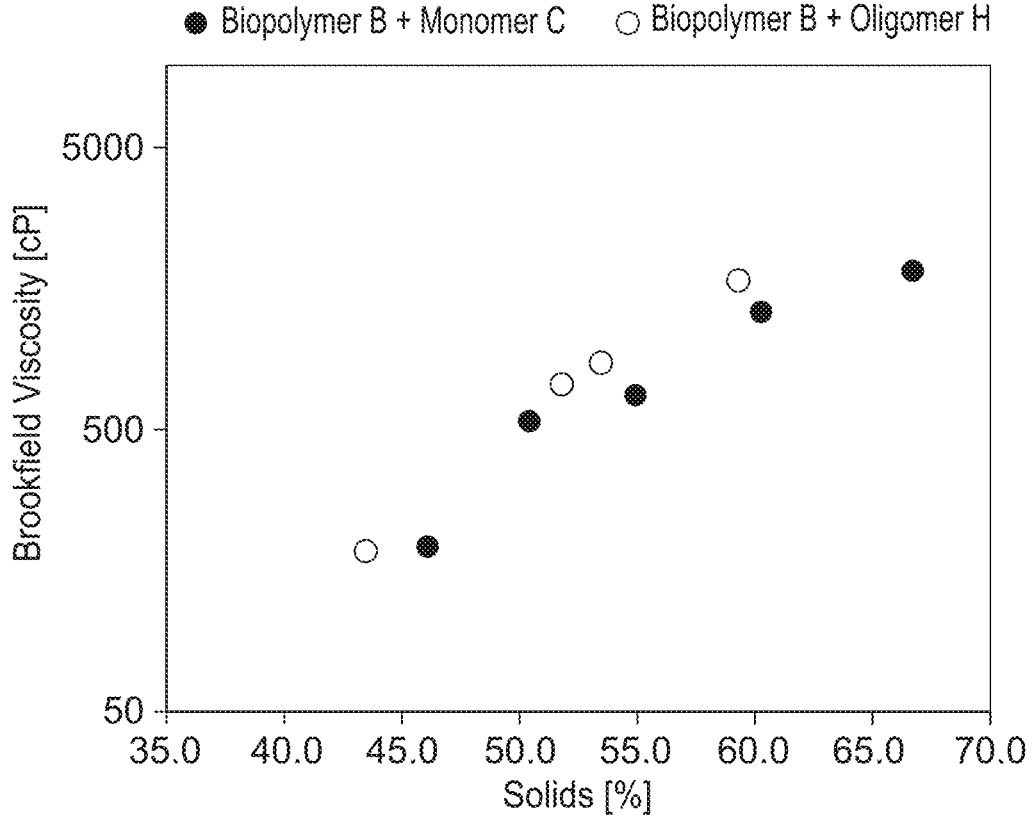
FIG. 2 is a graph showing viscosity of aqueous adhesive compositions at various solids concentrations.

The adhesive composition can have a solids (i.e. non-water) content in the range of 30-80 wt %, or a solids content in the range from 30-70 wt %. The viscosity of the adhesive composition tends to increase with solids content. The viscosity of the adhesive composition, as measured by a Brookfield viscometer at 25° C. and 100 rpm, ranges from 10 to 10000 centipoise. FIG. 2 shows viscosity of 50/50 mixtures of (i) biopolymer B and monomer C and (ii) biopolymer B and oligomer H, at various solids contents. Viscosity in FIG. 2 was measured using a Brookfield RV Viscometer using the appropriate spindle at 100 rpm at a temperature of 20-24° C.

The loading rate of an adhesive composition is the amount of dry (i.e. non-water) biopolymer as a percentage of the weight of substrate, excluding any water in the substrate. The loading rate of an adhesive composition may be in the range of 1-7 wt %. The adhesive composition may also contain some water. In the event that the adhesive composition, when applied to the substrate, does not have enough water to provide a selected moisture content to the substrate, additional water can be added separately. This additional water, and water present in the substrate, can be considered part of the adhesive composition present in an uncured glued composite substrate.

For the use in the production of lignocellulose-based (i.e. wood-based) composites, the adhesive composition can be combined with commonly used curable thermoset resins including, but not limited to, isocyanates such as methylenediisocyanate (MDI), toluenediisocyanate (TDI), polymeric methylenediisocyanate (pMDI), and emulsified methylenediisocyanate (eMDI). In the presence of aforementioned thermosets, the cohesive strength of the aqueous adhesive composition is not materially decreased and can be enough to maintain shape and/or mechanical integrity during handling, transport and processing operations. Furthermore, the adhesive composition does not detrimentally affect the curing chemistry of the thermoset. An isocyanate-based thermoset resin and an adhesive composition can be combined to form a curable hybrid resin composition, optionally in the form of a stabilized emulsion containing one or more isocyanates oil phase droplets analogous to compositions disclosed International Publication Number WO 2016/101063, which is incorporated herein. Alternatively, an adhesive composition and an isocyanate can be applied (i.e sprayed) to loose substrates separately.

The cohesive strength (or tack) of the loose substrate containing the aqueous adhesive composition (i.e. the uncured glued composite substrate) is measured by performing a "push test" as is described in detail in R. J. Leichti C. Y. Hse, R. C. Tang, J. Adhesion, 1988, 25, 31-44 and US patent application 8895643 B2 by G. G. Combs, N. Barksby and J. F. Dormish; 2014. In the "push test" the substrate containing the aqueous adhesive composition is pushed, at a constant speed, over an edge. The measure of tack is quantified by the distance (for example in cm) said substrate is able to pass until it breaks. The tack performance of the adhesive compositions contained herein are evaluated and compared to the cohesive strength of the loose substrate itself. The loose substrate has a cohesive strength as measured by "push test" of 0 cm. For the "push test" described in this invention, sufficient cohesive strength, defined as the cohesive strength required to maintain shape and/or mechanical integrity during handling, transport and processing operations, is preferably at least 5 cm at a push speed of 6 cm/s. As a point of comparison, the isocyanate thermoset resins do not impart any material cohesive strength to the loose substrate. Commonly used thermoset resins that do impart cohesive strength, such as aminoplastic thermoset resins based on formaldehyde, impart similar cohesive strength to the adhesive composition of the invention when applied at the same loading to dry loose substrate.

Aminoplastic thermoset resins such as those based on formaldehyde display a time-dependent tack development, i.e. the cohesive strength of the uncured glued composite substrate is changing with time. Typically, these aminoplastic thermoset resins display an optimum cohesive strength after a set amount of time after application of the resin, after which the cohesive strength decreases and ultimately disappears. This physical behavior has been attributed to changes in the rheological behavior due to water loss or pre-curing of the adhesive (see for example: A. Sahaf, K. Englund, M-P. G. Laborie, Holzforschung, 2011, 66, 73-78 or A. Himsel, J. Moser, W. Kantner, R. Mitter, J. Gießwein, H. W. G. van Herwijnen, U. Müller, Wood Sci. Technol. 2015, 49, 681-694). In contrast, the adhesive compositions described herein do not display time-dependent tack over a period of at least 1 hour after application of the adhesive composition onto the loose substrate and pre-pressing. This results in an adhesive composition that, within typical process variations, is largely insensitive to loss of moisture.

Example 1: General Description of Experimental Procedures

Resinating—Wood chips were conditioned at 70 degrees C. until a moisture content of approximately 3% was achieved. Wood chips were added to a resinator (8 paddle mixing vessel) and agitation started. Thermoset resin (if applicable), aqueous adhesive composition, and water were added over a period of about 5 minutes until the desired loading and mat moisture level were achieved. Following resinating, chips were layered (1 to 3 layers) into a 305 mm by 305 mm template to form a mat. The mat was subsequently pressed under 5.6 kg/cm$^2$ of pressure for 30 seconds using a hydraulic hand press.

Cured board preparation—A single-layer or three-layer mat, resinated as described above, was cured in a wood press using a press temperature of 200-220° C. and a press-factor of 5-8 seconds/mm.

Tack test—Tack is measured by performing a "push test", where the mat is pushed at a constant speed over an edge. A board is used to push evenly along the width of the mat. Reported tack measurements are the distance from the edge of the push off surface to the edge of the board when the first crack is observed in the board. The device used to perform the "push test" is adapted from the one described in detail in R. J. Leichti C. Y. Hse, R. C. Tang, J. Adhesion, 1988, 25, 31-44. A similar device has been described in US patent application 8895643 B2 by G. G. Combs, N. Barksby and J. F. Dormish; 2014. Push speed was 6 cm/s.

Various different biopolymer samples used in making adhesive compositions are described in Table 1 below. In the case of biopolymer nanoparticles, these were made by reactive extrusion generally as described in International Publication Number WO 2008/022127. The degree of polymerization (DP) if known is included in the table.

TABLE 1

Summary of Biopolymer Samples

| Biopolymer | Composition | Resource | Form | Functional Additives | DP |
|---|---|---|---|---|---|
| A | >90% carbohydrate | Waxy corn starch | Engineered crosslinked nanoparticles (Ecosphere 2202 from EcoSynthetix) | pH modifier biocide | 906 |
| B | >90% carbohydrate | Blend 75% waxy corn starch and 25% potato starch | Engineered crosslinked nanoparticles | pH modifier biocide | 445 |
| C | >50% carbohydrate <10% protein | Degermed yellow corn meal | Engineered crosslinked nanoparticles | pH modifier biocide | |
| D | >90% carbohydrate | Waxy corn starch | Cold water soluble waxy corn starch | pH modifier Biocide | 29744 |

TABLE 1-continued

Summary of Biopolymer Samples

| Biopolymer | Composition | Resource | Form | Functional Additives | DP |
|---|---|---|---|---|---|
| E | >90% carbohydrate | Cationic waxy corn starch | Cold water soluble cationic waxy corn starch | pH modifier Biocide | 21028 |
| F | >99% carbohydrate | Waxy corn starch | Dextrin | None | 100 |
| G | >99% carbohydrate | Waxy corn starch | Maltodextrin DE 4-7 from Sigman Aldrich | None | 22 |
| H | >30% protein | Soy flour | Defatted soy flour - Prolia ®FLR-200/90 from Cargill | None | |
| I | 80% protein | Protein | Pea protein isolate - PURISPea* 860 from Cargill | None | |
| J | >99% carbohydrate | Waxy corn starch | Maltodextrin EE 16.5-19.5 from Sigma Aldrich | None | 8 |
| K | >90% carbohydrate | Waxy corn starch | Cold water soluble dextrin - C*Film 07791 from Cargill | None | 44 |
| L | >99% carbohydrate | Waxy corn starch | Maltodextrin - Clintose CR10 from ADM | None | 9-13 |
| M | >99% carbohydrate | Waxy corn starch | Dextrin - Cargill Plus 8702 | None | 46 |
| N | >99% carbohydrate | Waxy corn starch | Dextrin - Cargill Plus 8703 | None | 26 |
| O | >99% carbohydrate | Waxy corn starch | Dextrin - Cargill Plus 8507 | None | 11 |

Various monomers or oligomers were used as described in Table 2 below. Samples A to E, I, and J are monomers. Samples F, G and H are oligomers with a DP of 2.

TABLE 2

Summary of Monomers and Oligomers

| Monomer/Oligomer | Resource | Form | Purity |
|---|---|---|---|
| A | Sigma Aldrich D9559 | Dextrose monohydrate | N.A. |
| B | Sigma Aldrich S1876 | D-Sorbitol | ≥98% |
| C | Univar CA2805 | Glycerol (crude) | 88%-92.3% |
| D | Acme Hardesty | Glycerol | 99.7% |
| E | Sigma Aldrich 101727644 | Diethylene glycol | ≥99.0% |
| F | Sigma Aldrich 84100 | Sucrose | ≥99.0% |
| G | Molasses from Suiker Unie | Molasses | 100% |
| H | Isoclear 42 from Cargill | High Fructose Corn Syrup | 100% |
| I | Sylvite | Urea | >98% |
| J | BCCA BioChemical | Anhydrous citric acid | >99% |

Example 2: Tack Produced by Various Biopolymers, Monomers, Oligomers and Adhesive Compositions The tack performance of various individual biopolymers or monomers/oligomers, and various adhesive compositions, was compared by adding the biopolymer, monomer/oligomer or adhesive composition at a loading of 5%, based on total dry weight of all biopolymer, monomer and oligomer (as applicable) compared to the dry weight of the loose substrate. The loose substrate was wood chips (single layer face chips). The moisture content of the substrate was 16%, measured after addition of the aqueous adhesive composition and including about 3% water previously in the substrate. The tack of the loose substrate without any biopolymer or monomer/oligomer was determined to be 0-3 cm.

The tack produced by Monomer E, Monomer C, Oligomer G, or a mixture of Monomer C and Oligomer G, each without a biopolymer, was in the range of 3-4 cm. Biopolymer B without a monomer/oligomer delivered a tack of 4.5 cm. Biopolymer C and Biopolymer D were tested, each without a monomer/oligomer, delivered tack similar to that of Biopolymer B.

Figure 3:
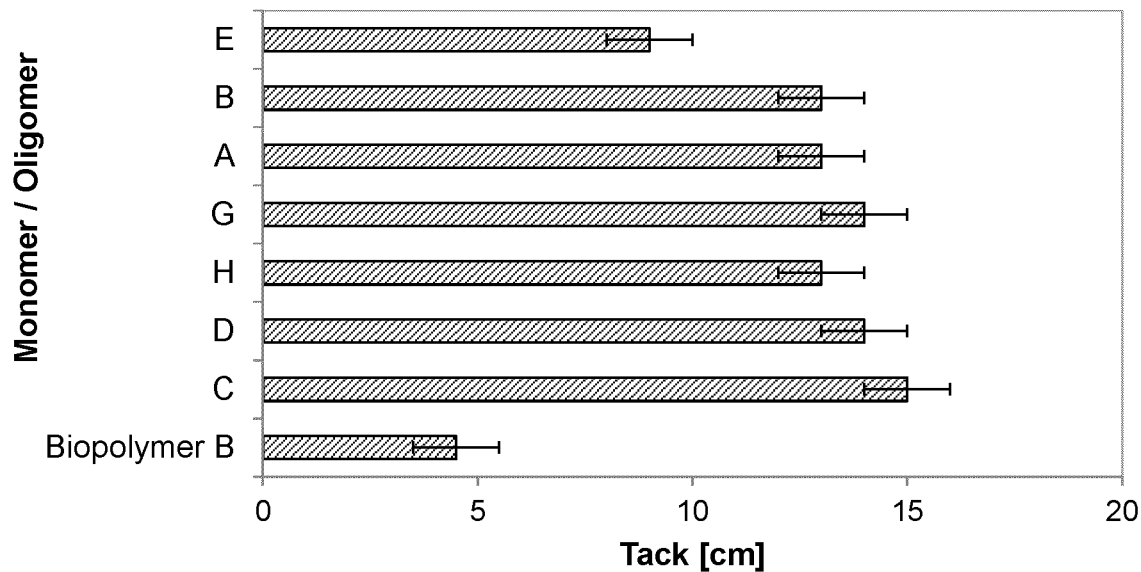
FIG. 3 is a graph showing tack for aqueous adhesive compositions with various monomers or oligomers.

Adhesive compositions with a combination of Biopolymer B and either Monomer E, Monomer B, Monomer A, Oligomer G, Oligomer H, Monomer D or Monomer C, each at a 50/50 weight percent ratio of biopolymer to monomer or oligomer, delivered tack of 9, 13, 13, 14, 13, 14 and 15 cm, respectively, as shown in FIG. 3. Adhesive compositions with a combination of Biopolymer B or Biopolymer C or Biopolymer D and Monomer I, each at a 50/50 weight percent ratio of biopolymer to monomer or oligomer, delivered tack of 16, 17 and 15 cm, respectively.

Figure 4:
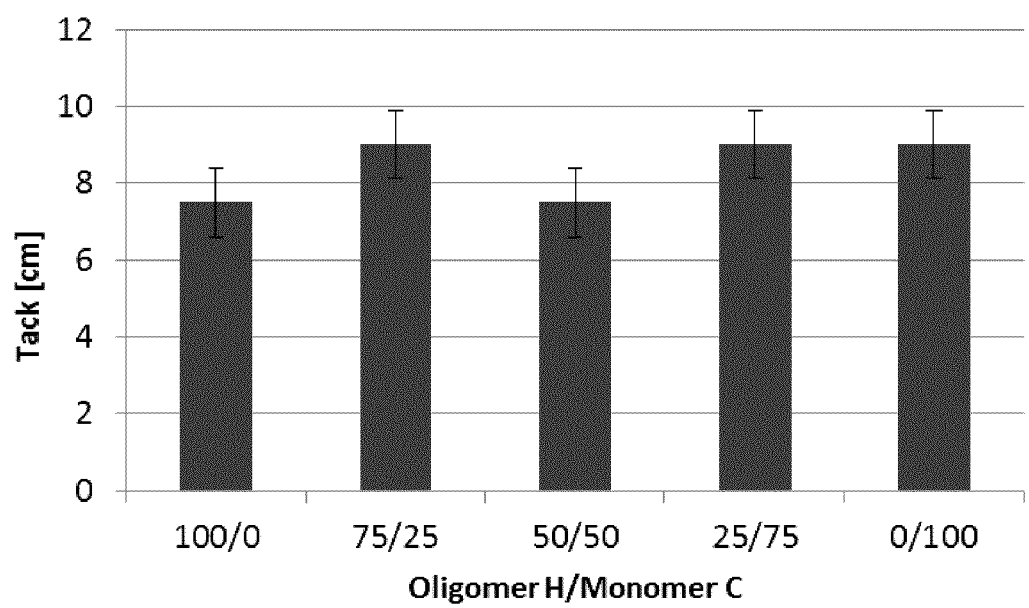
FIG. 4 is a graph showing tack for aqueous adhesive compositions with mixtures of an oligomer and monomer.

Referring the FIG. 4, adhesive compositions with a combination of Biopolymer B and a blend of Oligomer H and Monomer C, at a 50/50 weight percent ratio of Biopolymer B to the blend, delivered tack of about 7-9 cm. The blend ratio between Oligomer H and Monomer C did not cause a material variation in the measured tack.

Figure 5:
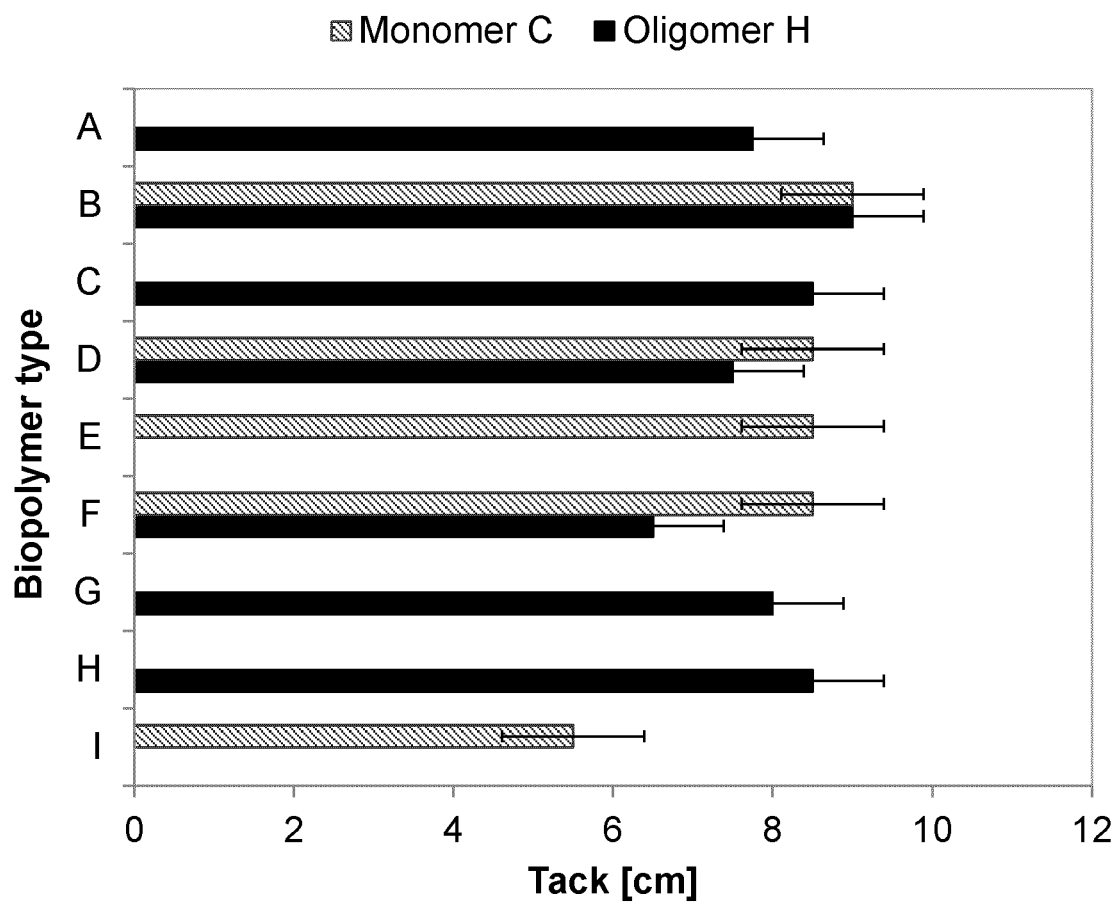
FIG. 5 is a graph showing tack for aqueous adhesive compositions with various biopolymers.

FIG. 5 shows results for blends of various biopolymers and Monomer C or Oligomer H, each at a 50/50 weight percent ratio of biopolymer to monomer or oligomer.

The examples above demonstrate that the monomers and oligomers and biopolymers with high DP do not develop tack on their own at up to 16% moisture. However, tack is substantially improved by combining a biopolymer with high DP with various monomers or oligomers, or with a mixture of oligomer and monomer.

Figure 10:
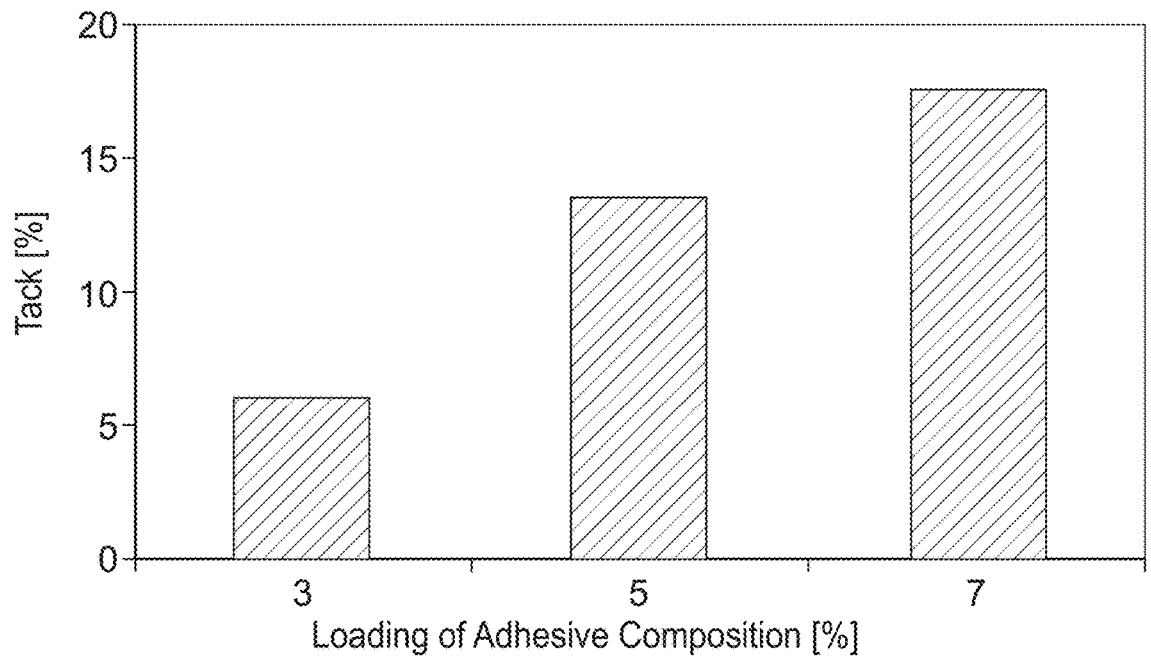
FIG. 10 is a graph showing tack at various loadings of an aqueous adhesive composition.

FIG. 10 shows tack at various loadings of an aqueous adhesive composition made with a 50/50 mixture of Biopolymer B and Oligomer H at 16% moisture. Loadings in the range of 3-7 wt % can be used. The tack increases with loading.

Further tests of the tack performance of various biopolymers, monomer/oligomers and adhesive compositions was performed by adding the biopolymer, monomer/oligomer or adhesive composition at a loading of 5% based on dry weights of the biopolymer, monomer and oligomer (as applicable) and loose substrate. Each adhesive composition had a 50/50 blend of biopolymer and monomer/oligomer, i.e. 2.5% biopolymer based on dry weight of the loose substrate and 2.5% monomer/oligomer based on dry weight of the loose substrate. When a biopolymer, monomer or oligomer was applied alone its loading was 5% based on dry weight of the loose substrate. The loose substrate was wood chips. Moisture content after addition of the biopolymer, monomer/oligomer or aqueous adhesive composition was 14%, including water present in the substrate before addition of the biopolymer, monomer/oligomer or adhesive composition. The tack of the loose substrate was determined to be 0-3 cm.

Tack of the various biopolymers, monomer/oligomers or adhesive compositions is reported in table 3 below. As indicated in the table, some of the biopolymers with low DP are able to create material tack alone or with a monomer or oligomer at 14% moisture. Mixtures of biopolymers with high BP and monomers/oligomers at the same total loading rate also produce material tack.

TABLE 3

Tack of various various biopolymers, monomer/oligomers or aqueous adhesive compositions

| Biopolymer | Monomer/Oligomer | Tack (cm) |
| --- | --- | --- |
|  | A | 3 |
|  | C | 3 |
|  | D | 3 |
|  | G | 3 |
|  | H | 3 |
| A |  | 3 |
| D |  | 3 |
| J |  | 13 |
| K |  | 9.5 |
| L |  | 16 |
| N |  | 18 |
| O |  | 13-16 |
| A | C | 11.5 |
| A | D | 11.5 |
| A | H | 12 |
| A | I | 12 |
| A | K | 10 |
| A | L | 8 |
| B | A | 10.5 |
| B | B | 11 |
| B | C | 10 |
| B | H | 10 |
| B | I | 12 |
| C | C | 8.5 |
| D | C | 7.5 |
| D | D | 9 |
| D | H | 8.5 |
| F | H | 13 |
| H | C | 8.5 |

TABLE 3-continued

Tack of various various biopolymers, monomer/oligomers or aqueous adhesive compositions

| Biopolymer | Monomer/Oligomer | Tack (cm) |
| --- | --- | --- |
| K | I | 9.5 |
| L | I | 11.5 |
| N | I | 10.5 |
| O | I | 10.5 |

Example 3: Effect of Ratio of Biopolymer to Monomer/Oligomer

FIG. 1 shows the tack results for three aqueous adhesive compositions prepared with varying amounts of monomer or oligomer relative to biopolymer, by weight. The X-axis on FIG. 1 is the fraction in wt % of monomer/oligomer in the mixture of monomer/oligomer and biopolymer. The push speed used was 6 cm/s. The target tack was an average of 5 cm and/or a statistically significant increase in tack relative to a control composition without (0 wt %) monomer/oligomer. While some of the compositions reached the target tack at 20% monomer/oligomer, others required about 25% monomer/oligomer. At 37.5%, or about 40%, all samples achieved about twice the tack of the control sample. Tack above the target of 5 cm was maintained at up to 75% monomer/oligomer. Linear interpolation of FIG. 1 suggests that target tack is likely maintained with up to at least 80% monomer/oligomer. The total loading of monomer or oligomer and biopolymer combined was 5 wt %. The moisture content was 16 wt % (including about 3 wt % water in the substrate). The substrate was single layer face chips. The was no pMDI or other resin in the mixture. The results indicate that, at least with biopolymers having a high DP, for example 100 or more, tack is generated from a combination of monomer/oligomer and biopolymer. The monomer/oligomer fraction can be in the range of 0.2 to 0.8, optionally about 0.4 (i.e. including 0.375) to 0.6 or 0.8, optionally near 0.5.

Example 4: Comparative Efficacy of Adhesive Composition

Figure 11:
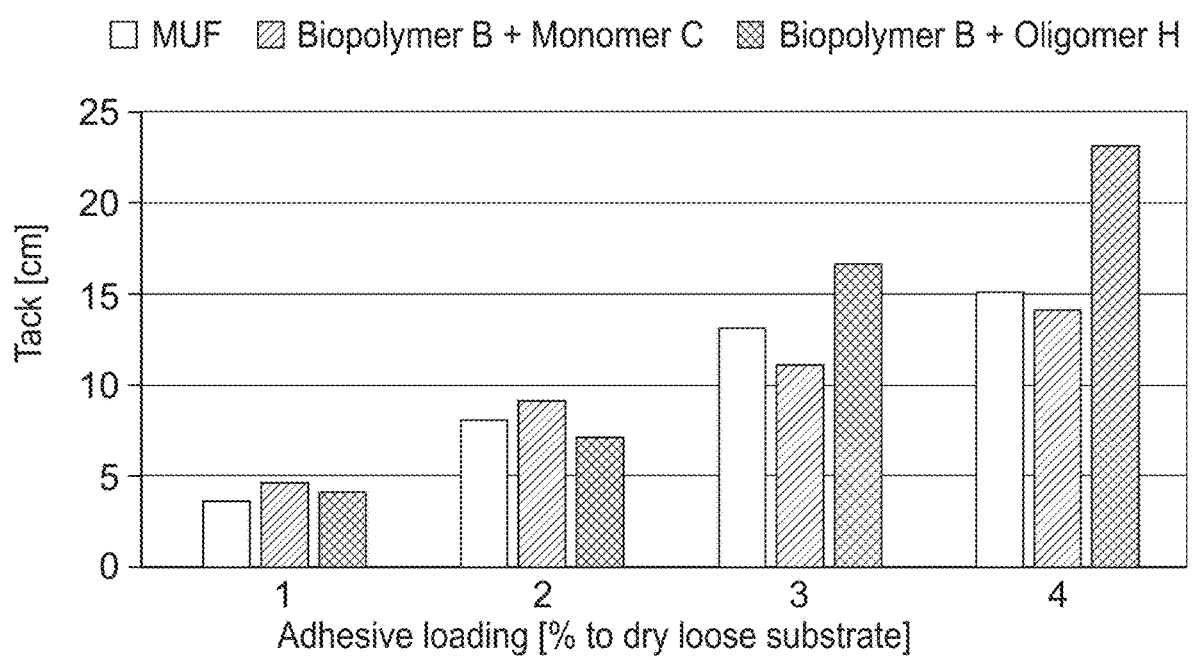
FIG. 11 is a graph comparing tack of an aqueous adhesive composition compared to tack of a melamine urea formaldehyde (MUF) resin.

Aqueous adhesive compositions comprising of biopolymer B and monomer C, and biopolymer B and oligomer H were prepared and compared to a commercial melamine urea formaldehyde (MUF) resin over a loading range of 1 to 4 percent, based on dry wood chips. The wood chips were resinated with the aqueous adhesive compositions and enough water to constitute a wood particle mat at 16% moisture, based on dry weight of the loose substrate. It can be seen from FIG. 11 that the aqueous adhesive compositions disclosed herein have at least equal performance to a commercially available MUF resin.

Example 5: Tack Development with Time

Figure 6:
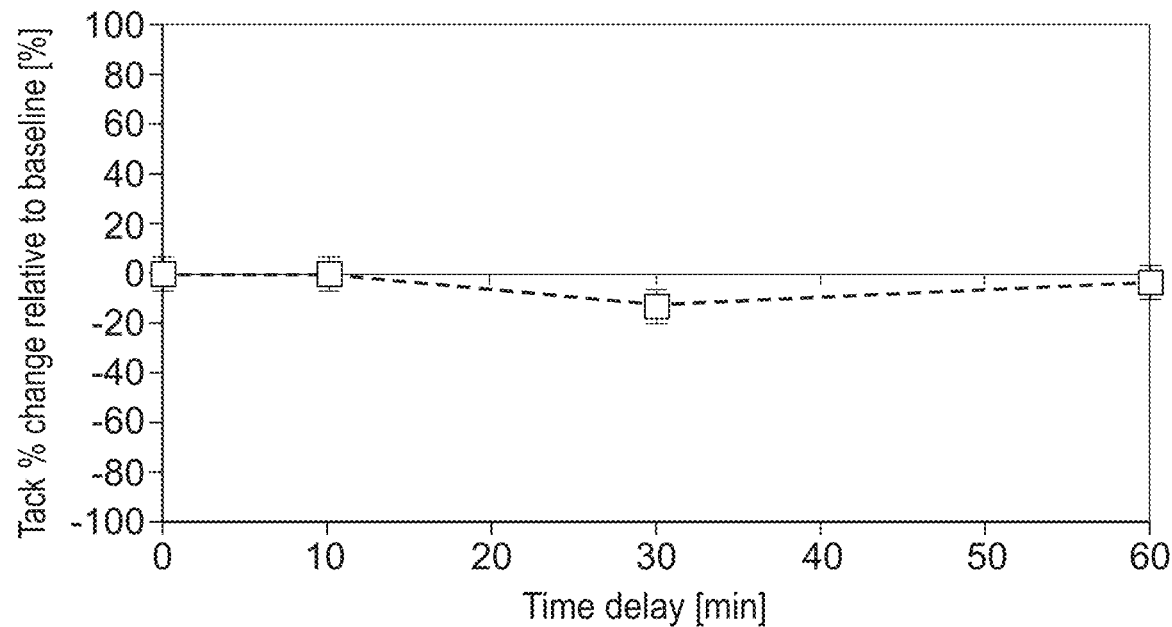
FIG. 6 is a graph showing variation in tack over time.

The tack performance over time of an aqueous adhesive composition with a 50/50 blend by weight of biopolymer B and Monomer C was evaluated. Wood chips were resinated with 5 wt % aqueous adhesive composition based on dry weight of the loose substrate and enough water to constitute a wood particle mat at 16% moisture, based on dry weight of the loose substrate. The material was pre-pressed under 5.6 kg/cm$^2$ of pressure for 30 seconds and the push test performed after a predetermined hold time of 0, 10, 30, and 60 minutes (each push constituted material that was freshly resonated and pre-pressed). Moisture loss was less than 0.1%. It can be seen from FIG. 6 that the tack performance of the aqueous adhesive compositions disclosed herein is not time dependent. There was no material loss in tack performance over 1 hour.

Example 6: Compatibility with Curable Thermoset Resin

Figure 7:
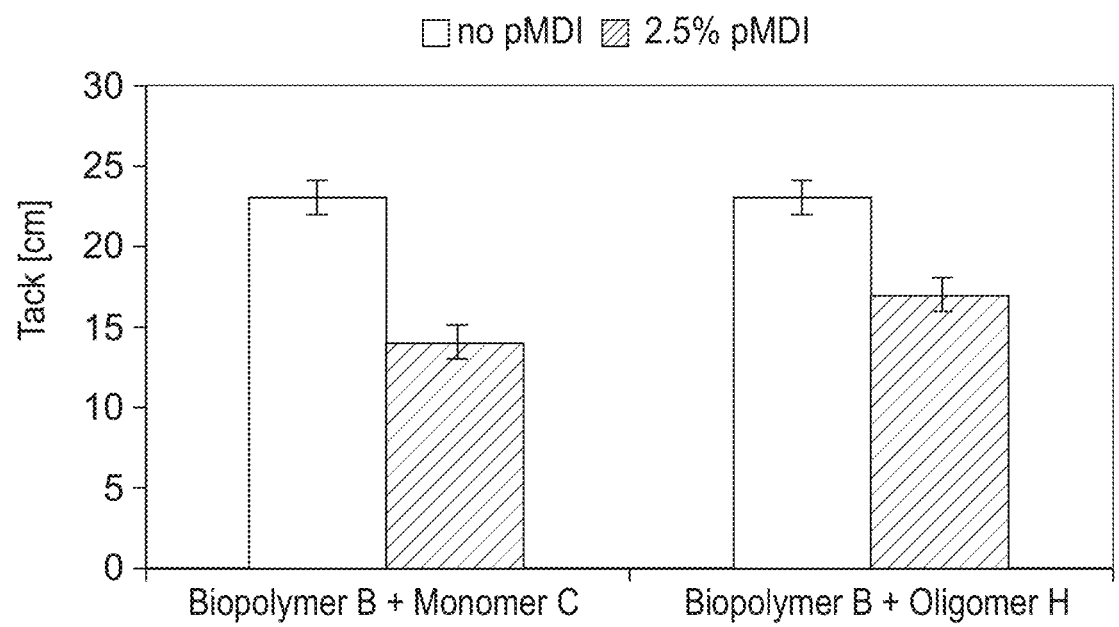
FIG. 7 is a graph showing tack for aqueous adhesive compositions with and without an isocyanate resin.

Face chips were mixed with 50/50 mixtures of (i) Biopolymer B and Monomer C and (ii) Biopolymer B and Oligomer H, at loading of 5 wt % with enough water to produce 16 wt % water. Tack was tested with and without the further addition of 2.5 wt % pMDI. As shown in FIG. 7, the addition of the pMDI reduced the tack, but tack was still significant.

Figure 8:
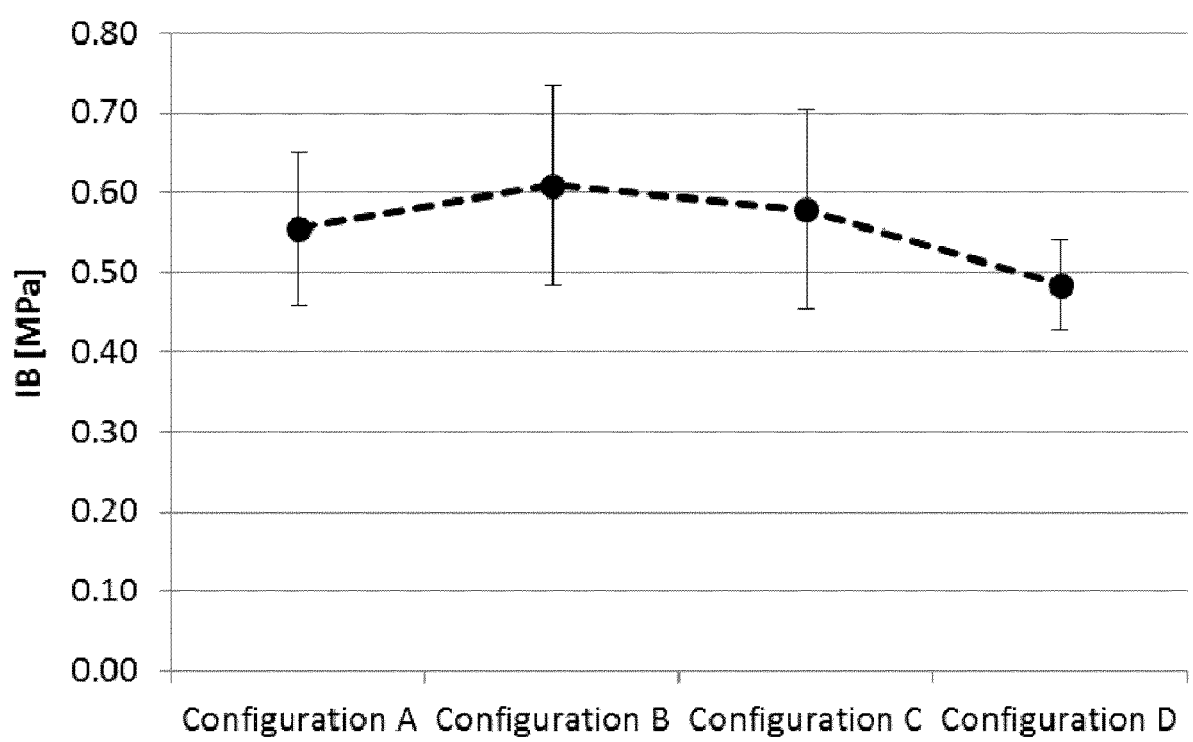
FIG. 8 is a graph showing internal bond strength (IB) for aqueous adhesive compositions with an isocyanate added under various conditions.

Wood substrate was mixed with 2 wt % pMDI and 6.5 wt % water in configuration A and, in configurations B, C, and D, 2 wt % pMDI, 4 wt % of a 50/50 mixture of Biopolymer B and Oligomer H and enough water to produce 6.5 wt % water. In configuration B, the aqueous adhesive composition was sprayed on the wood separately from the pMDI. In configuration C, the pMDI was emulsified in half of the aqueous adhesive composition and the emulsion was sprayed on the wood, and the other half of the aqueous adhesive composition was separately sprayed on the wood. In configuration D, the pMDI was emulsified in all of the aqueous adhesive composition and then the emulsion was sprayed on the wood. Boards were pressed at 200° C. and 5.5 s/mm. Tack was similar in configurations B, C and D. As shown in FIG. 8, the strength of the board was not materially affected by whether the aqueous adhesive composition was sprayed on the wood separate from the pMDI or in a mixture with the pMDI.

Example 7: Creating Emulsions

Figure 9:
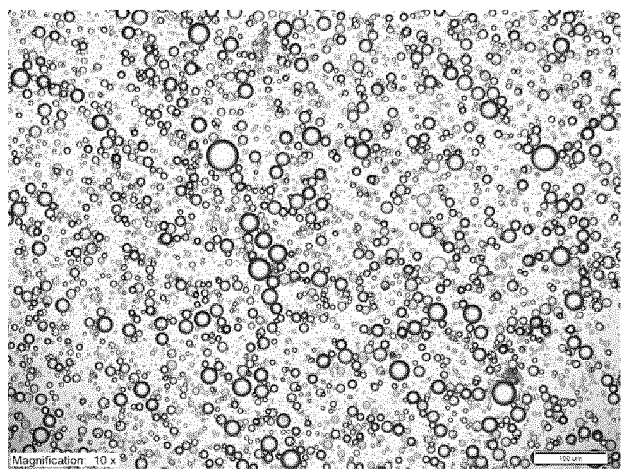
FIG. 9 contains light microscopy images of emulsions of an isocyanate (pMDI) in an aqueous adhesive composition at different pMDI:Water phase ratios (ß). The scale bar in the images equals 100 μm.
Figure 9:
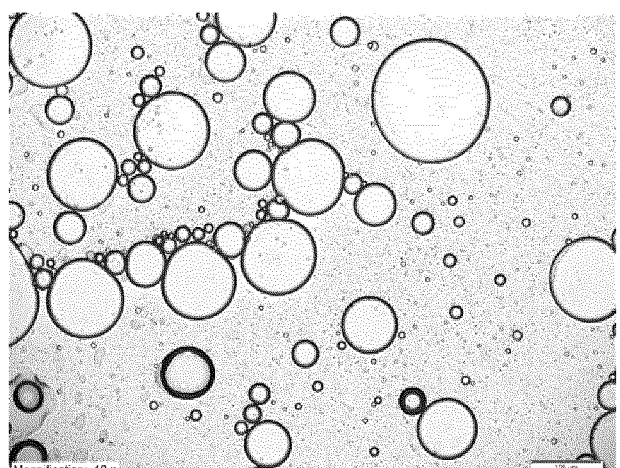
Figure 9:
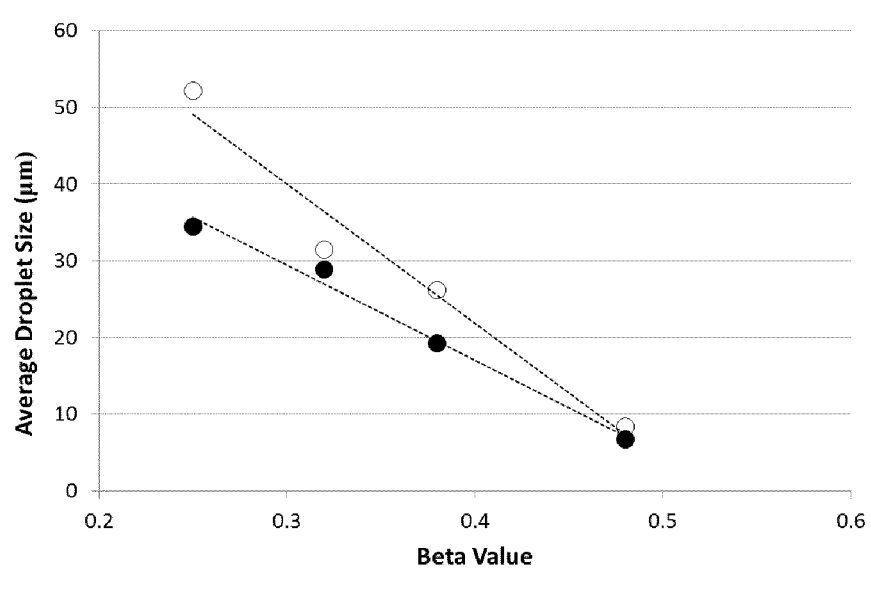

FIG. 9 contains photographs of pMDI emulsified in an adhesive composition to produce a curable hybrid resin composition at different pMDI:Water phase ratios, or Beta Value (ß). As shown in the photographs, and in the graph in FIG. 9, average droplet size varied with Beta Value. Based on experiments with biopolymer and pMDI mixtures, it is expected that acceptable viscosity for spraying can be produced when the weight of pMDI is not more than 150%, or preferably not more than 130% or 110% of the weight of water, and when the combined weight of biopolymer and pMDI is not more than 200% of the weight of water. However, an emulsion can be prepared at a pMDI:Water phase ratio of up to 1.5 or more and then diluted to a phase ratio of 1.5 or less for application to wood. Such dilution can produce a more stable emulsion. Optionally, emulsions are produced at ß=0.8 or more, and then diluted if desired to reduce viscosity for spraying.

Example 8: Creating Wood Composite Boards

Figure 12:
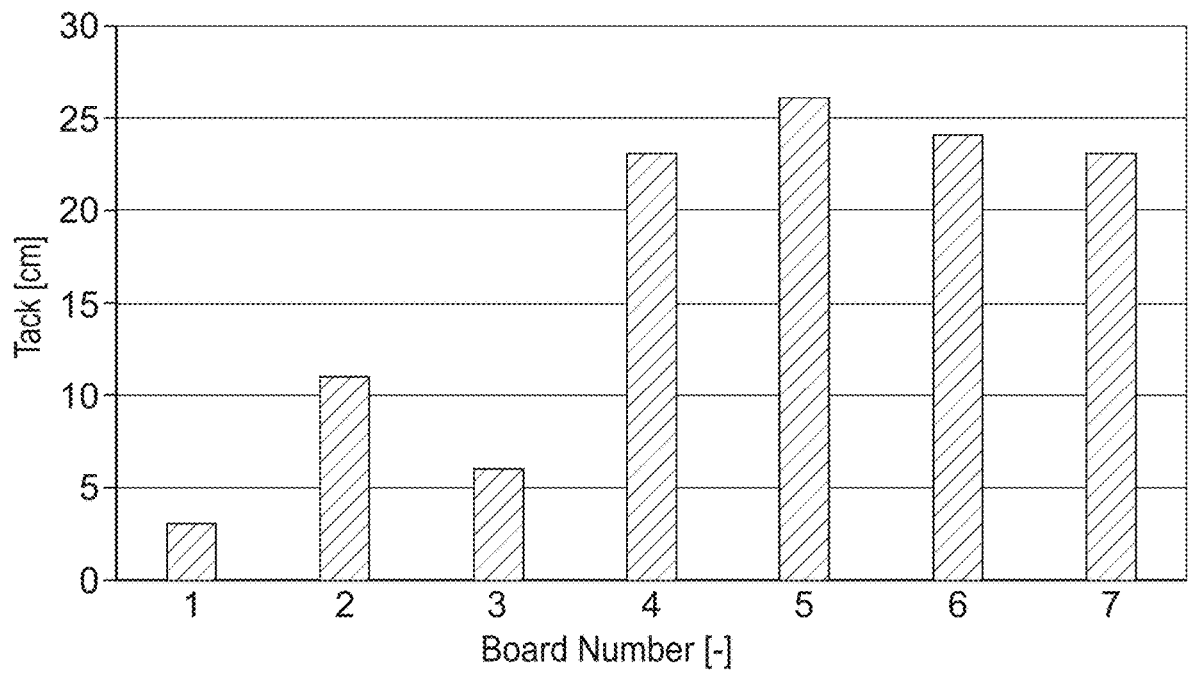
FIG. 12 is a graph comparing tack of particle board samples made with an aqueous adhesive composition in different layers of the board.
Figure 13:
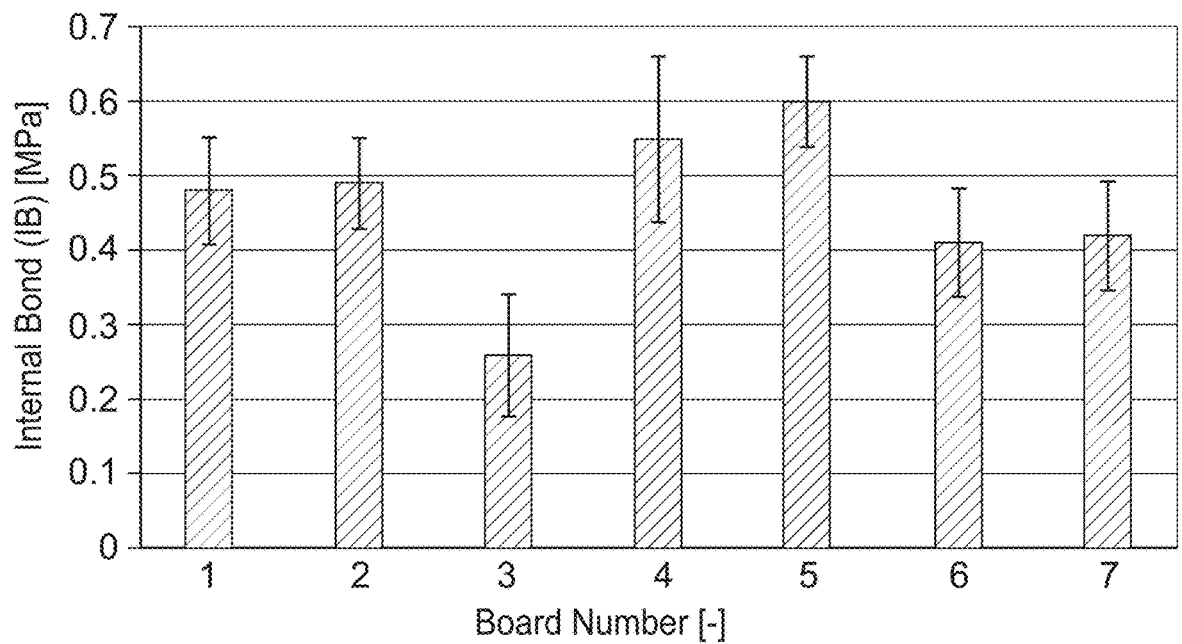
FIG. 13 is a graph comparing internal bond of particle board samples made with an aqueous adhesive composition in different layers of the board.

Seven wood composite boards were prepared with pMDI. The boards were made in 3-layers with a 20-60-20 wt % distribution between the layers, 2.25 wt % pMDI in the core and 1.95 wt % pMDI in the face layers. The boards were 440 mm by 440 mm by 15 mm thick, with a target of 650 kg/m³. Curing was done at 200° C. at 8 s/mm. Board 1 contained Biopolymer B. Boards 2, 4 and 6 contained a 50/50 mixture of Biopolymer B and Monomer C. Boards 3, 5 and 7 contained a 50/50 mixture of Biopolymer B and Oligomer H. The substrate had been previously dried to 3 wt % moisture. After addition of aqueous adhesive compositions, the core had 7 wt % moisture and the face layers each had 12 wt % moisture. Board 1 had 0.75 wt % of biopolymer B in the core and 1.05 wt % of biopolymer B in the face layers. Boards 2 and 3 had 3 wt % solids loading of the aqueous adhesive composition in the core. Boards 4 and 5 had 6 wt % solids loading of the aqueous adhesive composition in the face layers. Boards 6 and 7 had 3 wt % solids loading of the aqueous adhesive composition in the core and 6 wt % solids loading of the aqueous adhesive composition in the face layers. Tack of the boards is given in FIG. 12. Strength of the boards is given in FIG. 13, except the data for board 3 in FIG. 13 was at a press factor of 7 instead of 8. Tack can be imparted on a 3-layer particleboard mat by adding the adhesive composition to the core and/or the face. Board strength is good in all configurations.

Particleboard is typically made in 3 layers. Core moisture content is typically 5-9 wt %. Face moisture content is typically 10-14 wt %.

Figure 14:
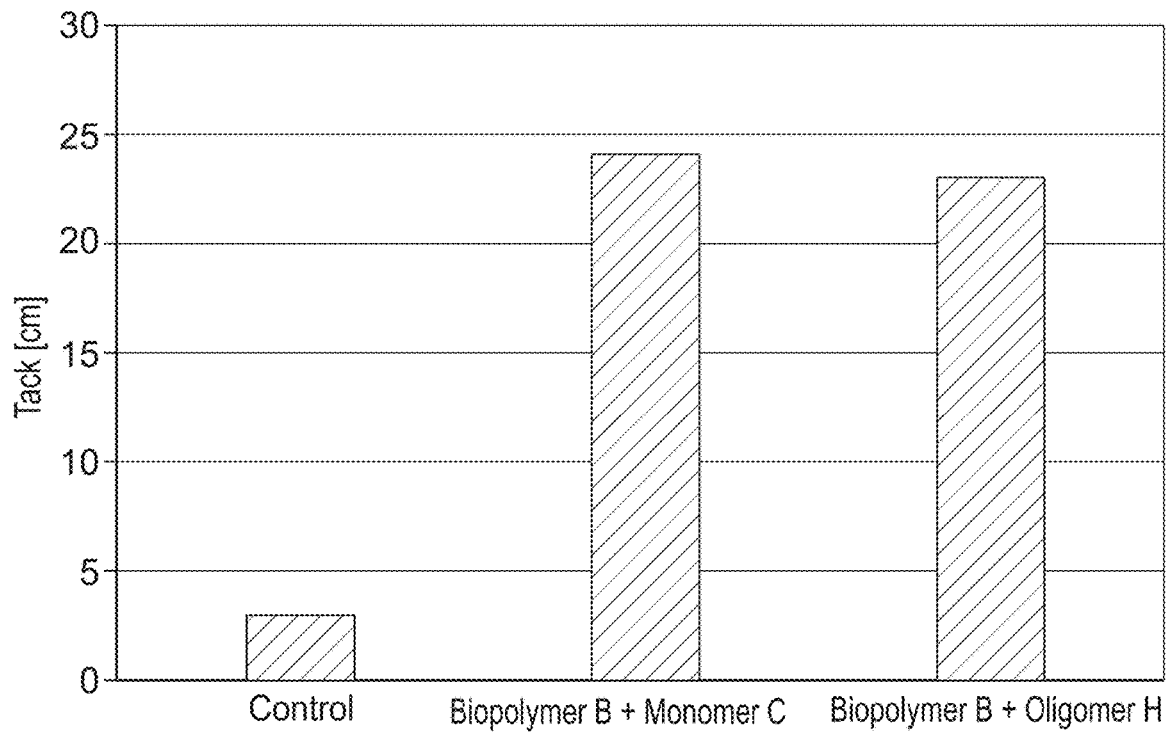
FIG. 14 is a graph comparing tack of a particle board control with particle board samples made with various aqueous adhesive.
Figure 15:
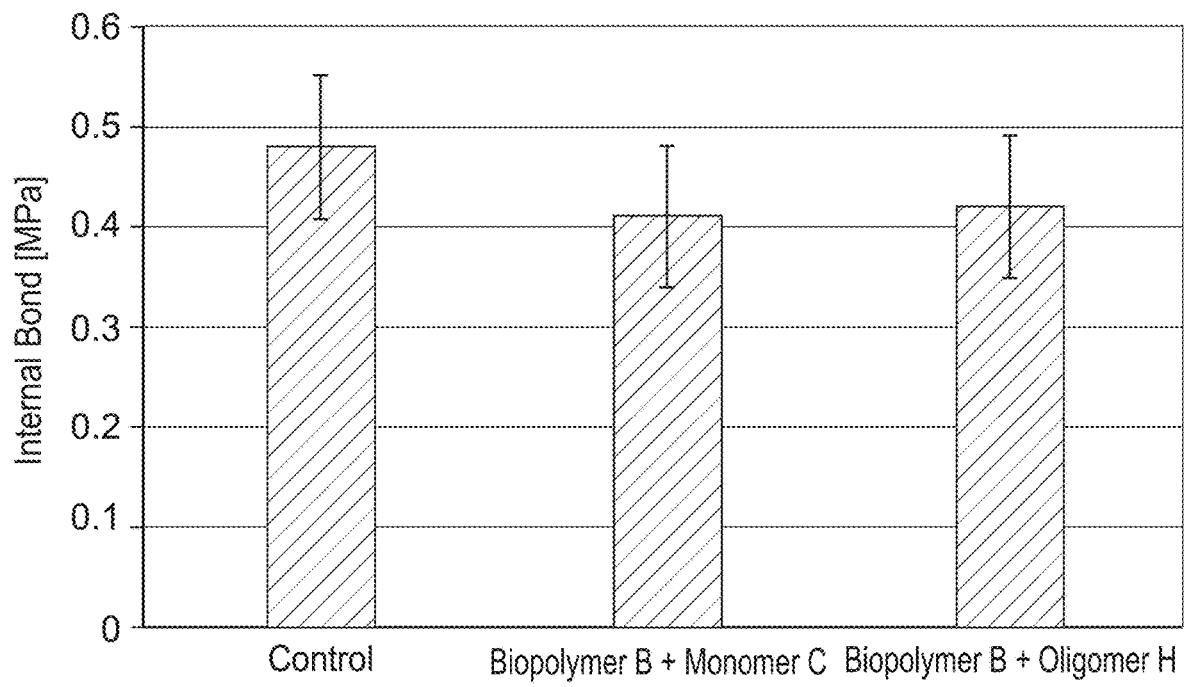
FIG. 15 is a graph comparing internal bond strength of a particle board control with particle boards samples made with various aqueous adhesive.

Composite articles were prepared as follows: (1) by resinating core wood chips with either 3% of the aqueous adhesive composition comprising biopolymer B and monomer C or 3% of the aqueous adhesive composition comprising biopolymer B and oligomer H and enough water to constitute a wood particle mat at 7% moisture, based on dry weight of the loose substrate, (2) by resonating face wood chips with 6% of the aqueous adhesive composition comprising biopolymer B and monomer C or 6% of the aqueous adhesive composition comprising biopolymer B and oligomer H and enough water to constitute a wood particle mat at 12% moisture, based on dry weight of the loose substrate. Resonated core and face material was used to prepare a mat consisting of 40% face and 60% core material. The mats were evaluated for tack performance using a push test (FIG. 14) or cured in the wood press at 220° C. at a press factor of 8 seconds/mm (FIG. 15). It can be seen from FIGS. 14 and 15 that the tack performance of the aqueous adhesive compositions disclosed herein provides excellent tack in the presence of curable thermoset resin and does not interfere with the performance of the curable thermoset resin.

Example 9: Low DP Biopolymers

Face board samples were made with mixtures of low DP biopolymers (i.e. DP of 50 or less) and Oligomer H or Monomer I. Loading of the aqueous adhesive composition was 5 wt %. Moisture content was 14 wt %. The aqueous adhesive compositions were blended with varying ratios of oligomer to biopolymer. As indicated in Table 4, under these conditions the tack generally increased with increasing biopolymer content demonstrating very little synergistic effect with the oligomer, and that the biopolymer itself generates significant tack at high moisture content.

TABLE 4

Effect of Monomer:Biopolymer Composition

| Composition [dry w/w] | | Single layer face Tack [cm] | |
| --- | --- | --- | --- |
| Oligomer H | Biopolymer | Biopolymer J | Biopolymer K |
| 100 | 0 | 7 | 7 |
| 75 | 25 | 6 | 6.5 |
| 50 | 50 | 7 | 8.5 |
| 25 | 75 | 8.5 | 10.5 |

TABLE 4-continued

Effect of Monomer:Biopolymer Composition

| Composition [dry w/w] | | Single layer face Tack [cm] | |
|---|---|---|---|
| Oligomer H | Biopolymer | Biopolymer J | Biopolymer K |
| 20 | 80 | | 11.5 |
| 10 | 90 | | 12 |
| 5 | 95 | | 13 |
| 0 | 100 | 13 | 14 |

Example 10: Low Moisture Conditions

Another low DP biopolymer, Biopolymer L, similarly produced a tack of 13-16 cm when used at 5 wt % solids and 14 wt % moisture, without an oligomer or monomer. Tack decreased to 11 cm when biopolymer L was blended 50/50 with oligomer H at the same total solids content (i.e. biopolymer L was reduced to 2.5 wt % solids). However, this trend was reversed when biopolymer L was used at 4 wt % solids and 7 wt % moisture. As shown in Table 5, under these conditions Biopolymer L produced almost no tack when used alone but produced significant tack when blended 50/50 with oligomer H at the same 4 wt % solids (i.e. biopolymer L was reduced to 2 wt % solids).

TABLE 5

Tack at low moisture content

| Tackifier | Loading [% on dry wood] | Mat moisture [%] | Single layer core tack [cm] |
|---|---|---|---|
| Biopolymer L | 5% | 14% | 16 |
| Biopolymer L + Oligomer H | 5% | 14% | 11 |
| Biopolymer L | 4% | 7% | 1.5 |
| Biopolymer L + Oligomer H | 4% | 7% | 18 |
| Biopolymer K | 4% | 8.5% | 3 |
| Biopolymer K + Oligomer H | 4% | 8.5% | 13 |
| Biopolymer B | 3% | 10% | 4 |
| Biopolymer B + Monomer I | 5% | 10% | 17 |
| Biopolymer A | 4% | 10% | 4 |
| Biopolymer A | 5% | 16% | 6 |
| Biopolymer A + Oligomer H | 4% | 10% | 18 |
| Biopolymer A + Monomer I | 4% | 8.5% | 16 |
| Biopolymer A + Monomer I | 5% | 16% | 13 |
| Biopolymer C + Monomer I | 4% | 8.5% | 17 |
| Biopolymer D + Monomer I | 4% | 8.5% | 14.5 |

Example 11: Addition Method of the Tackifier

Aqueous adhesive compositions each having a 50/50 mixture of Biopolymer B and one of Monomer C, H or I were added to a resinator in one of three methods: (1) pre-formulated, (2) mixing immediately prior to addition or (3) separate. Wood chips dried to 2-3% moisture were fed to the resinator. In the resinator, 4 wt % solids loading of aqueous adhesive composition and enough water to constitute a wood particle mat at 12% moisture were added. Tack of the wood particle mat was added. The tack measurements in cm are shown in Table 6 below. As indicated in the table, the components of the aqueous adhesive composition can be added as pre-formulated resin, mixed immediately prior to use, or sprayed separately on the substrate without affecting tack performance.

TABLE 6

| | Formulated | Mixed | Separate |
|---|---|---|---|
| Biopolymer B + Monomer C | 16.0 | 15.5 | 16 |
| Biopolymer B + Monomer H | 16.0 | 16.5 | 16 |
| Biopolymer B + Monomer I | 16.5 | 14.5 | 15 |

Although the adhesive compositions have been described above for use primarily with wood substrates, in other they may provide tack with other substrates. In other examples, curable hybrid resin compositions may be made with other reactive compounds.

We claim:

1. A curable hybrid resin composition comprising:
   (a) water;
   (b) one or more polysaccharide or polypeptide biopolymers;
   (c) one or more monomers or oligomers having an average degree of polymerization of 4 or less; and,
   (d) one or more isocyanates,
   wherein a ratio of the one or more monomers or oligomers to the one or more biopolymers is in the range of about 30:70 to about 80:20 by weight, and
   wherein the one or more biopolymers contain more than 80 wt % starch on a dry basis,
   and wherein the one or more biopolymers comprise starch nanoparticles.

2. The composition of claim 1 wherein the one or more biopolymers comprise one or more proteinaceous materials.

3. A curable hybrid resin composition comprising:
   (a) water;
   (b) one or more polysaccharide or polypeptide biopolymers;
   (c) one or more monomers or oligomers having an average degree of polymerization of 4 or less; and,
   (d) one or more isocyanates,
   wherein a ratio of the one or more monomers or oligomers to the one or more biopolymers is in the range of about 30:70 to about 80:20 by weight,
   wherein the one or more biopolymers comprise one or more proteinaceous materials, and
   wherein the one or more proteinaceous materials contain more than 15 wt % protein but less than 40% protein on a dry basis.

4. The composition of claim 1 wherein the ratio of the one or more monomers or oligomers to the one or more biopolymers is 37.5:62.5 by weight or more.

5. The composition of claim 1 wherein the ratio of the one or more monomers or oligomers to the one or more biopolymers is 75:25 by weight or less.

6. The composition of claim 1 wherein the number-average degree of polymerization of the one or more biopolymers is 100 or more or 300 or more.

7. The composition of claim 1 wherein the one or more monomers or oligomers comprise a compound selected from the group of compounds with the ability to form hydrogen bonds.

8. The composition of claim 1 wherein the one or more monomers or oligomers comprise a compound selected from the group of compounds containing one or more free hydroxyl groups.

9. The composition of claim 1 comprising an oil phase in water, wherein the oil phase comprises an isocyanate.

10. The composition of claim 1 wherein the one or more biopolymers comprise a cellulosic material or hemicellulosic material.

11. The composition of claim 1 wherein a ratio of: (a) all monomers and oligomers having an average degree of polymerization of 4 or less in the composition to (b) all polysaccharide biopolymers and polypeptide biopolymers in the composition, is in the range of about 30:70 to about 80:20 by weight.

12. The composition of claim 1 consisting essentially of the water, the one or more biopolymers containing more than 80 wt % starch on a dry basis, the one or more monomers or oligomers having an average degree of polymerization of 4 or less, the one or more isocyanates and one or more additives selected from the group consisting of: pH modifiers, rheology modifiers, biocides and humectants.

13. The composition of claim 1 having a viscosity of 1000 cP or less at 40C.

14. The composition of claim 1 wherein the one or more monomers or oligomers are selected from the group consisting of: urea and oligomers having an average degree of polymerization of 4 or less.

15. The composition of claim 1, wherein the starch nanoparticles have an average particle size of 1 micron or less.

16. A method of making a wood composite comprising a step of, applying a composition to a wood based substrate wherein the composition comprises,
(a) water;
(b) one or more polysaccharide or polypeptide biopolymers; and,
(c) one or more monomers or oligomers having an average degree of polymerization of 4 or less,
wherein a ratio of the one or more monomers or oligomers to the one or more biopolymers is in the range of about 30:70 to about 80:20 by weight, and
wherein the one or more biopolymers contain more than 80 wt % starch on a dry basis,
and wherein the one or more biopolymers comprise starch nanoparticles.

17. The method of claim 16 wherein the one or more biopolymers are applied to pieces of a substrate at a loading rate of about 1-7% by weight, based on dry substrate.

18. The method of claim 17 wherein the ratio of the one or more monomers or oligomers to the one or more biopolymers is 37.5:62.5 by weight or more.

19. The method of claim 18 further comprising applying one or more isocyanates to the substrate at a loading rate of about 1-6% by weight based on dry substrate and wherein a ratio of the one or more biopolymers to the one or more isocyanates is in the range of 80:20 to 25:75.

20. The method of claim 16 wherein the substrate comprises wood chips or wood fines.

21. The method of claim 16 further comprising applying one or more isocyanates to the substrate.

22. The method of claim 16 wherein the composition is sprayed on the substrate.

23. A composite material comprising
wood; and,
(i) one or more polysaccharide or polypeptide biopolymers, (ii) one or more monomers or oligomers having an average degree of polymerization of 4 or less, and (iii) one or more isocyanates, collectively having a total weight between 2% and 11% of the weight of the wood on a dry basis,
wherein a ratio of the one or more monomers or oligomers to the one or more biopolymers is in the range of about 30:70 to about 80:20 by weight,
wherein the one or more biopolymers contain more than 80 wt % starch on a dry basis,
wherein the one or more biopolymers have a weight between 1% and 7% of the weight of the wood on a dry basis, and
wherein the one or more isocyanates have a weight between 1% and 6% of the weight of the wood on a dry basis,
and wherein the one or more biopolymers comprise starch nanoparticles.

24. The composite material of claim 23 wherein the ratio of the one or more monomers or oligomers to the one or more biopolymers is 37.5:62.5 by weight or more.

25. The composite material of claim 24 wherein a ratio of the one or more biopolymers to the one or more isocyanates is in the range of 80:20 to 25:75.

* * * * *